United States Patent [19]
Walker

[11] Patent Number: 5,137,297
[45] Date of Patent: Aug. 11, 1992

[54] TRAILERABLE STRUCTURE WITH RETRACTABLE TOWING HARDWARE

[76] Inventor: Douglas W. Walker, 550 E. 34th St., Durango, Colo. 81301

[21] Appl. No.: 565,332

[22] Filed: Aug. 9, 1990

[51] Int. Cl.$^5$ .................. B60G 9/02; B60D 00/00
[52] U.S. Cl. ................ 280/414.5; 280/6.12; 280/475; 280/656; 280/763.1
[58] Field of Search ................ 280/38–40, 280/641, 646, 42, 656, 639, 763.1, 475, 414.5, 764.1, DIG. 1, 6.1, 6.12

[56] References Cited

U.S. PATENT DOCUMENTS

| | | | |
|---|---|---|---|
| 2,110,944 | 3/1938 | Schultz | 280/40 X |
| 3,669,409 | 6/1972 | Eranosian | 280/475 X |
| 4,230,340 | 10/1980 | Wasservogel | 280/656 |
| 4,239,258 | 12/1980 | Burris | 280/639 |
| 4,253,677 | 3/1981 | Wissler | 280/656 X |
| 4,595,210 | 6/1986 | Groeing | 280/414.5 X |
| 4,746,142 | 5/1988 | Davis | 280/256 |
| 4,807,894 | 2/1989 | Walker | 280/63 |

FOREIGN PATENT DOCUMENTS 2194925  3/1988  United Kingdom ............ 280/763.1

Primary Examiner—Charles A. Marmor
Assistant Examiner—Kevin Hurley
Attorney, Agent, or Firm—Kenton L. Freudenberg; Maxwell C. Freudenberg

[57] ABSTRACT

A large flat exhibition platform of stair-step height (7½ inches) and convertible to a highway trailer has jacking apparatus, wheels, wheel suspension apparatus and a trailer towing member retractably concealed therein and includes an energy source, hydraulic or pneumatic motor devices and motor controls, also concealed within the platform, to provide jacking to raise and lower the platform relative to a ground surface and to move the wheel suspension apparatus between roadable and retracted wheel positions without the need for any extra tools or equipment. Safety interlocks warn the operator or prevent trailering operation when the wheels are not fully extended to their roadable positions or when the towing member is not fully extended to its towing position. A fully sealed deep-cycle battery provides power for motor-driven hydraulic pumps for hydraulic motors. The platform frame has primary structural components made from large steel tubing which has sealed portions thereof forming reservoirs for compressed gas for operating the pneumatic motors.

52 Claims, 15 Drawing Sheets

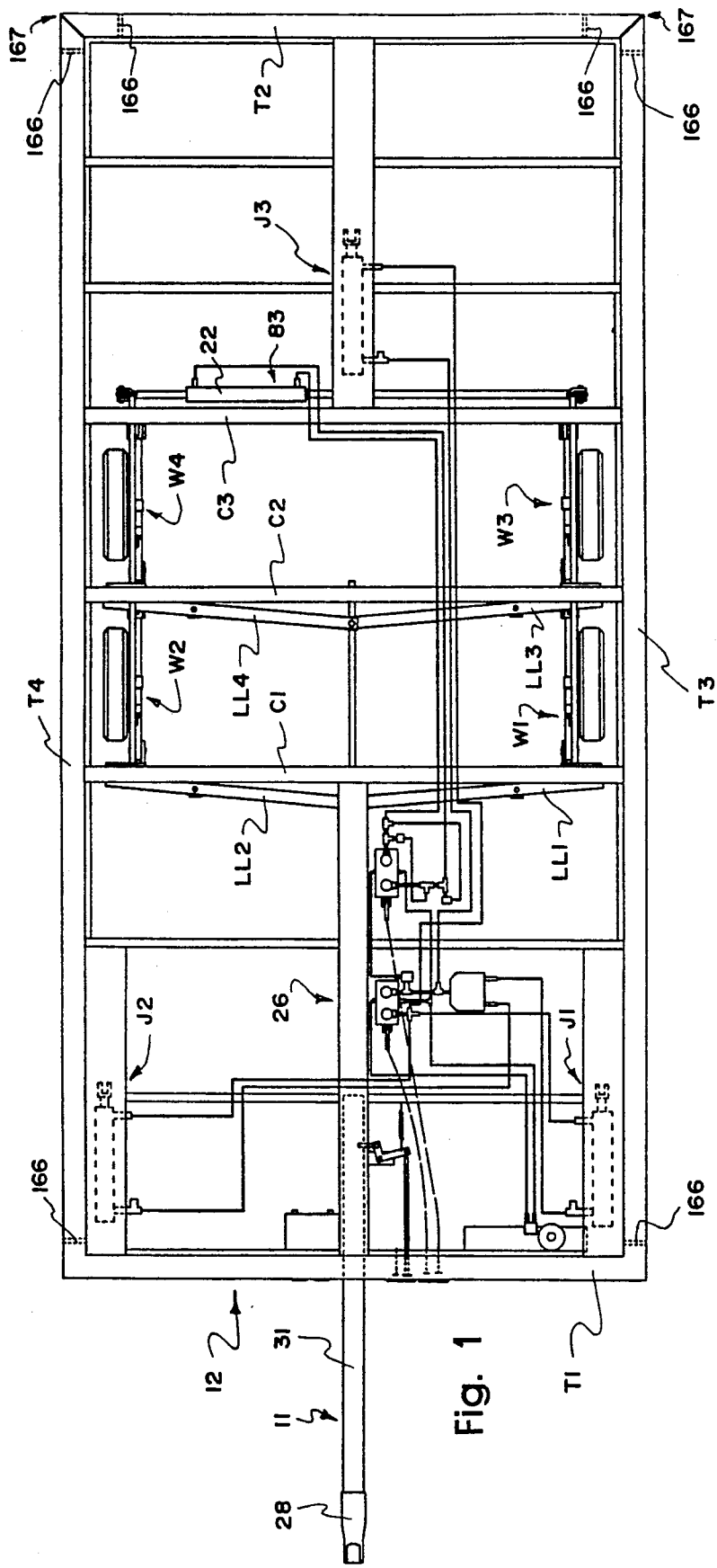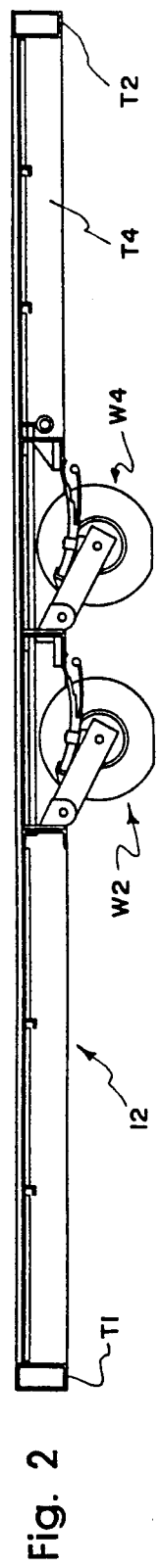

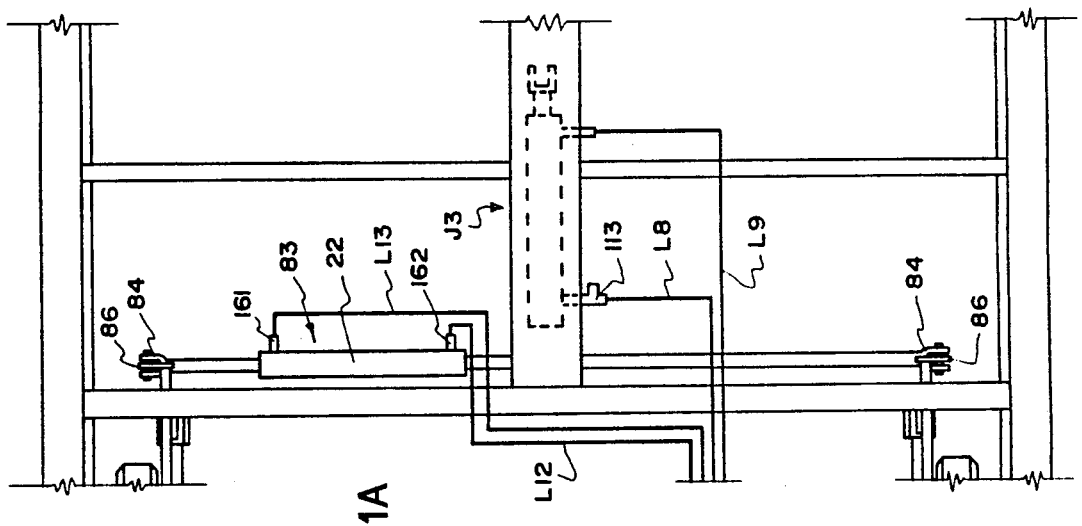
Fig. 1A
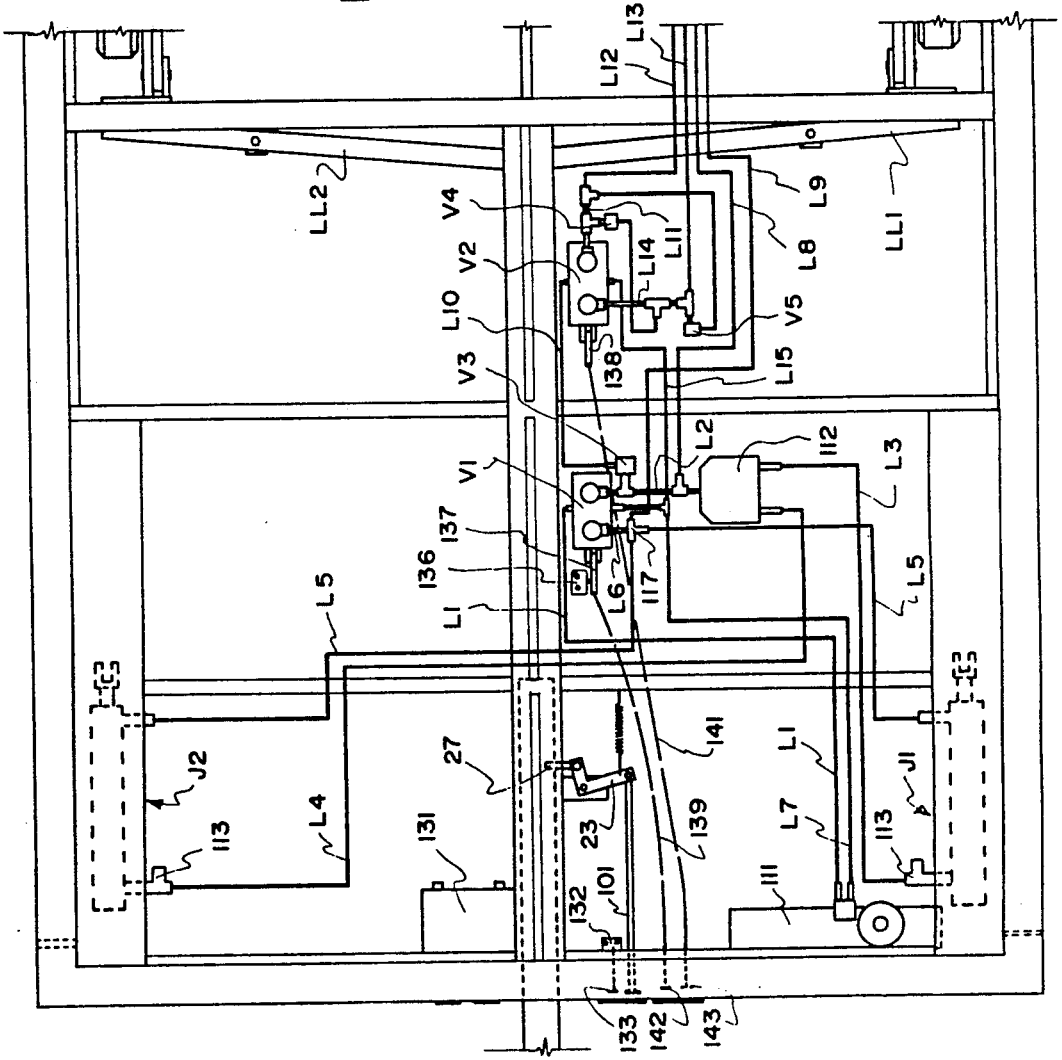

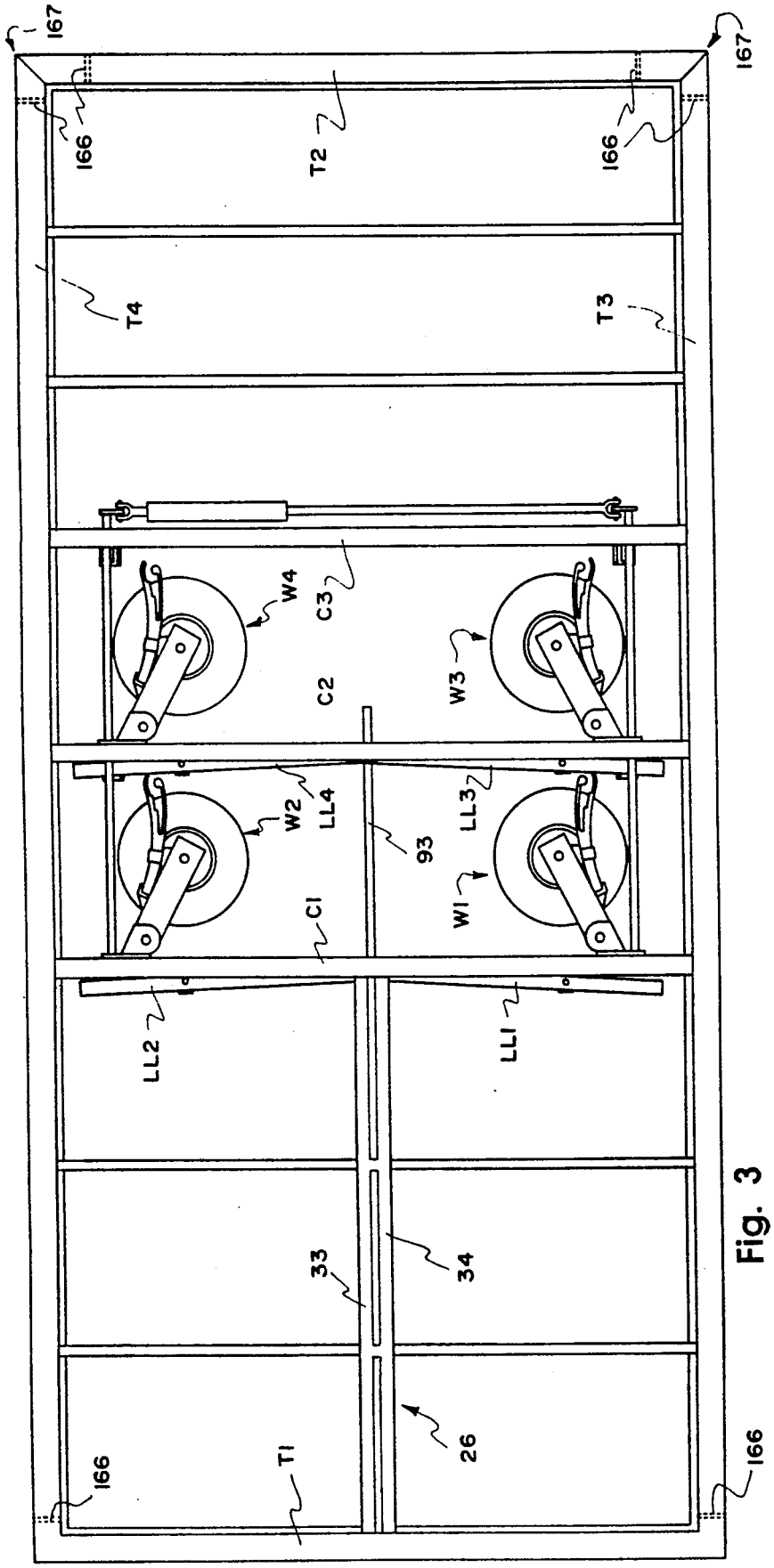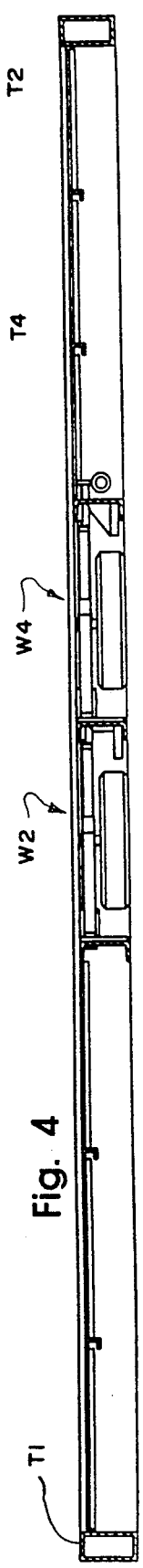
Fig. 3
Fig. 4

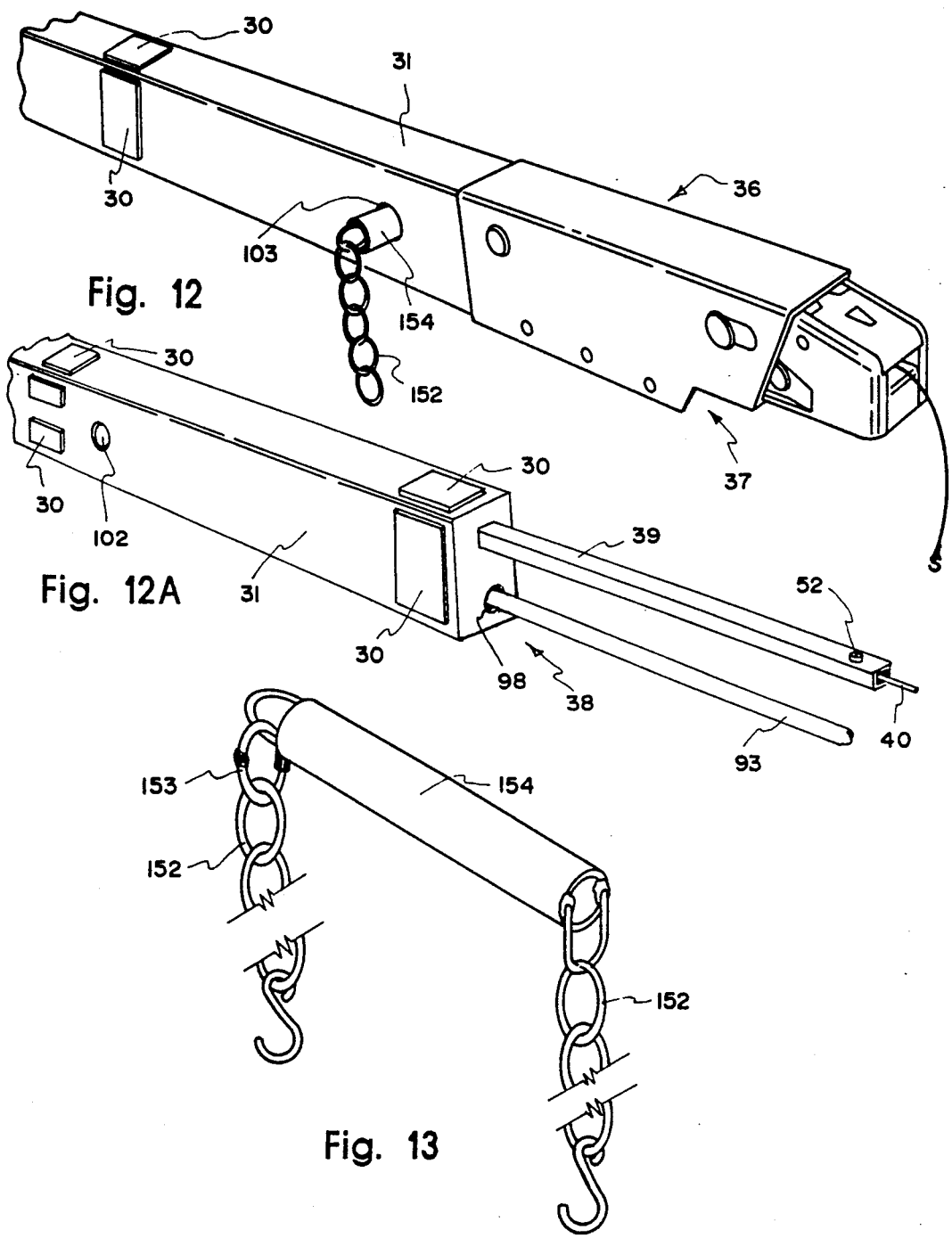

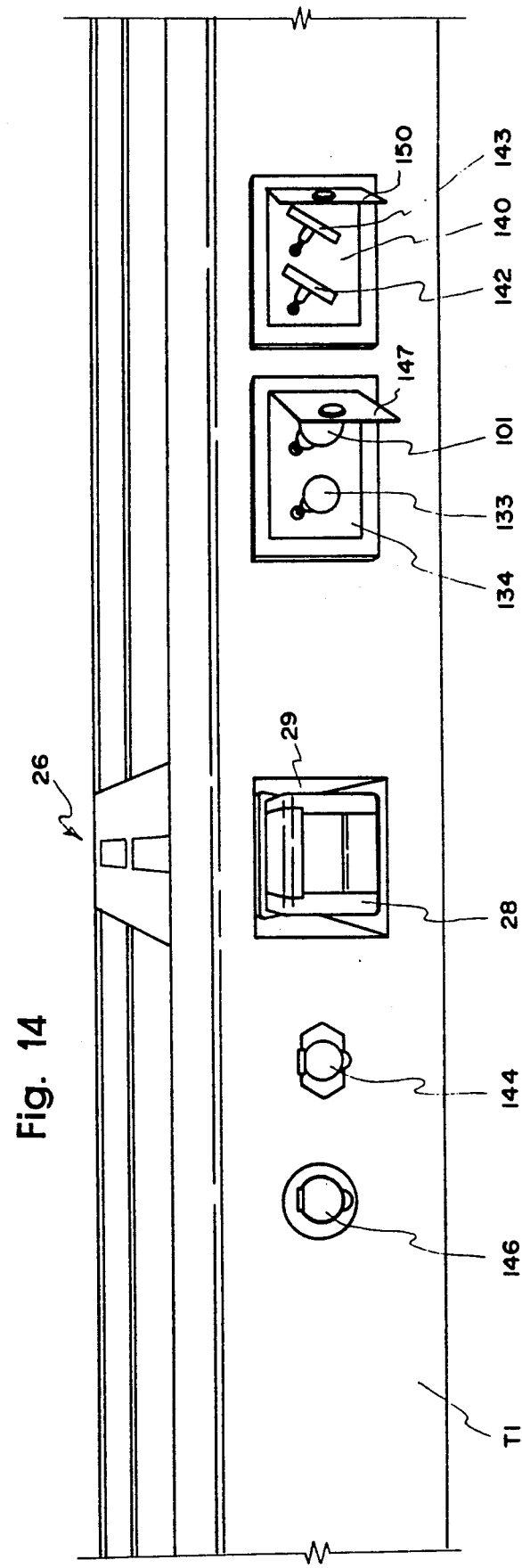

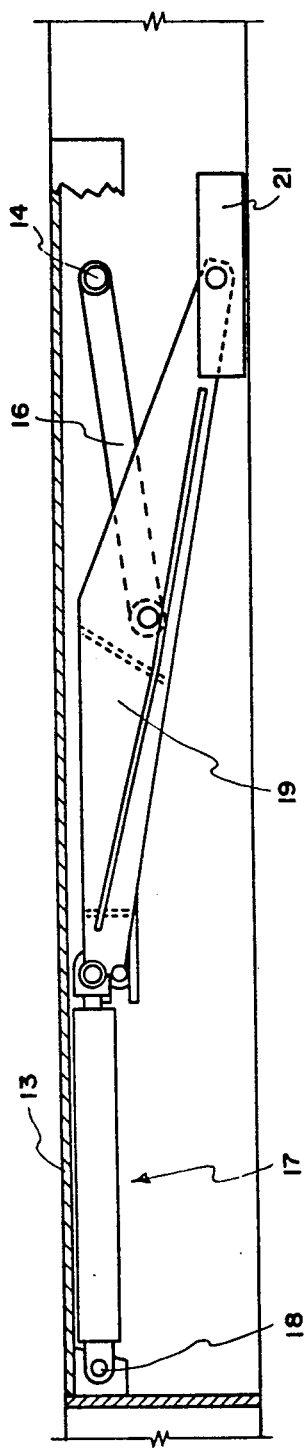
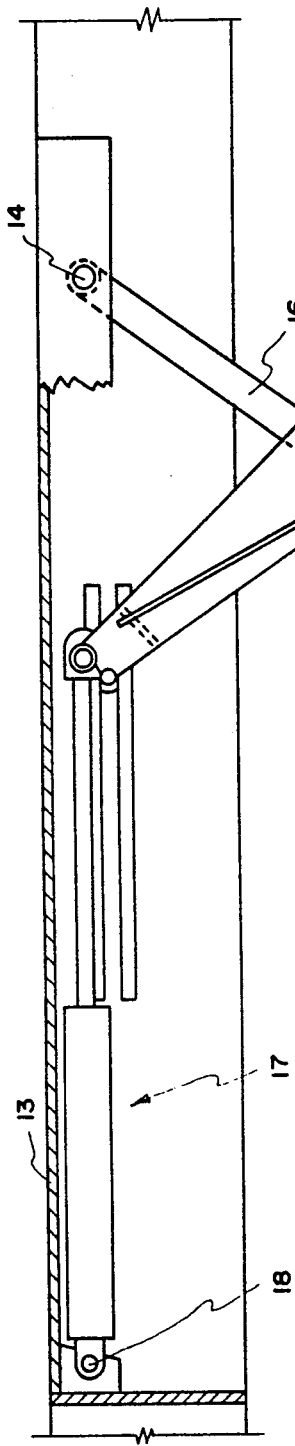
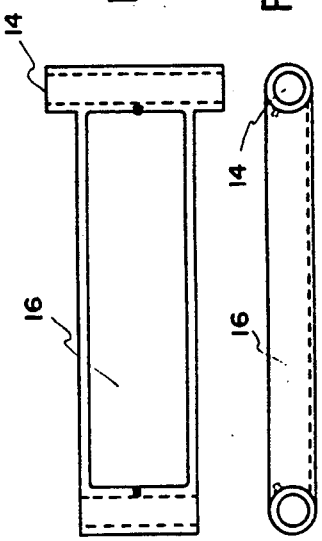
Fig. 15
Fig. 16
Fig. 17
Fig. 18

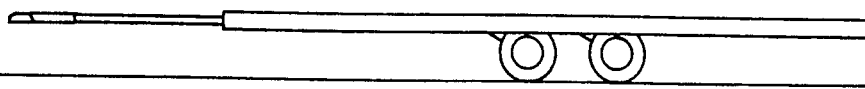
Fig. 22A
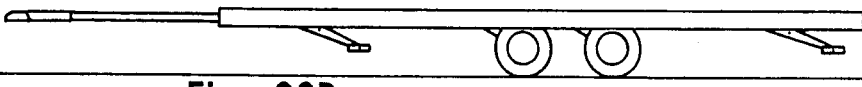
Fig. 22B
Fig. 22C

Fig. 22H

TRAILERABLE STRUCTURE WITH RETRACTABLE TOWING HARDWARE

BACKGROUND OF THE INVENTION

Structures which are used for temporary purposes such as concession stands, vending or display booths have often been constructed in the form of a trailer, which can be readily towed behind a vehicle to the site where it may be used. Such structures have a number of disadvantages in normal use. First, such structures are aesthetically unattractive, giving an appearance of impermanence. Trailers used on public roads must meet typical legal requirements which may include external lights, license plates, safety chains, which may also detract from the appearance of a trailer in its stationary configuration.

A wheeled trailer typically requires significant bracing and levelling to make it sufficiently stable to comfortably and safely handle the foot traffic of those working in the structure or visitors or other users who may enter or pass through it. Also, because of the space required for wheels and suspension the lowest point of the floor surface of a trailer must typically be located at a substantial distance above the ground, requiring a ladder, steps or similar means for safe entry and exit and thereby hindering the physical or visual accessibility of the interior.

While trailer structures with removable or retractable wheels have been heretofore available, these also have had inherent disadvantages. Structures with removable wheels are awkward and slow to disassemble, typically requiring the use of tools and handling of the wheels. Handling of the wheels is an inherently dirty chore and the removed wheels must be stored somewhere while they are off the trailer. Retractable wheels have typically required wheel wells extending up within the interior of the trailer and preventing the interior floor from having a completely even and flat surface.

SUMMARY OF THE INVENTION

The present invention provides a self-contained trailerable structure and energy source capable of being operated to rise, retract its wheels to a space entirely within its frame and then lower itself to the ground. This setup procedure is reversed to make the trailer structure physically and legally roadable again. The main operating mechanisms are constructed so that the lowered frame structure can provide a flat level floor surface and the height of the entire frame structure when collapsed and sitting on the ground does not exceed that of an ordinary stairstep. Furthermore all structures which are necessary for roadability, including the trailer tongue and the wheel assemblies, are hidden from view. The entire setup process and its reverse can be accomplished by a single individual without any tools and without any need to come into contact with the wheels of the structure. Once lowered into its stationary configuration the frame structure is essentially unidentifiable as a trailerable structure. Thus the structure sits solidly and provides an appearance of permanence. The structure further provides a high degree of safety and ease of operation by providing interrelated operation of mechanisms which prevent or warn against towing of the trailer if any necessary retractable structural components are not in place.

In accordance with this invention a trailerable platform having a generally rectangular frame has all of the components necessary for trailering secured thereto and concealed therein. Within a frame height which is not more than the height of one normal stairstep, all the parts recognized as conventional trailer parts are completely concealed or retracted within the trailer frame. The towing member or tongue of the trailer is completely retractable as are the spring suspension assemblies on which the wheels are supported. Motive mechanisms are provided within the frame for controllably jacking the frame to lift the wheels off the ground and for retracting the wheel assemblies to positions within the frame height. The jacking mechanisms are similarly completely retractable to positions concealed within the frame height to allow the frame to be lowered to rest on a floor or other flat supporting surface.

Suitable mechanical or electrical controls are provided within the frame for operating the jacking mechanisms and for retracting the wheel assemblies. The frame includes self-contained energy sources for all motor mechanisms which operate the jacks and wheel retracting mechanisms.

The energy sources may be pneumatic, electrical or chemical. For a pneumatic or gas pressure source energy may be supplied by compressed air or by steam generated by a steam boiler. The air pressure may be provided by air tanks forming part of the main structure of the frame and containing sufficient pressure for several operations of the various trailer mechanisms or compressed air may be supplied by a motor driven compressor.

Electrical energy may be stored in batteries within the frame to operate any suitable mechanical, hydraulic or pneumatic mechanisms. A chemical energy source may be a tank for storing a combustible gas for operating a steam boiler or a propane operated engine or may be other chemical means for generating gas or steam under pressure. A battery may also be considered to be a chemical source of energy.

It is an object of the invention to provide a compact exhibition platform having a sturdy structure which has a very low height consistent with or complying with recognized building codes to make it very easy to step atop the platform and having wheels and towing apparatus concealed therein and readily converted to extend from the platform to enable the platform to be moved by trailering is along a highway.

Another object of the invention is to make an exhibition platform of extremely low height easily and quickly convertible to or from a trailering configuration with minimum physical effort and without the need for any tools to achieve such conversion.

It is also an object of the invention to have low-height high-extension jacks concealed within the platform and operable for raising and lowering the platform during conversion operations and for emergency road use while trailering for changing flat tires.

A further object of the invention is to achieve conversion of a low platform to a trailering structure in a safe quick manner with warning means to indicate to the user when the conversion is not complete or is unsafe for trailering use.

Another object is to provide a low cost, simple, easily maintained and easily repaired trailer structure which is readily transportable in multiple quantities using minimum space in a transporting conveyance.

Still another object of the invention is to provide a convertible trailer structure which can be conveniently used to transport multiple other trailer structures like itself on highways in a manner complying with all safety and operating regulations.

Among other objects of the invention are to achieve an aesthetically pleasing clean totally self-powered trailer structure which can be completely changed to a simple similarly aesthetically platform configuration by easily operated manual controls and motor-driven conversion apparatus which remain concealed in both its trailering and platform configurations.

A further object of the invention is to provide a convertible trailer/platform structure which can support substantial loads both as a platform and while traveling on a highway at highway speed limits.

Another object of the invention is to provide stable safe support for a platform while it is converted from its platform configuration to a sturdy trailer configuration.

Further objects of the invention are to provide improved spring suspension and braking for trailer wheels and improved compressed air reservoirs for air-pressure operated trailer equipment which occupy minimum space in a trailer structure.

Another invention object is to provide a simple safe hydraulically or pneumatically operated system for conversion of an exhibition platform to a trailerable structure with controls and mechanisms therefor which are concealed and locked to prevent tampering with or unauthorized operation of the controls and mechanisms in an environment frequented by public persons.

DESCRIPTION OF THE DRAWINGS

FIG. 1 is a partial plan view of the frame structure of the preferred embodiment with the wheels in an extended position and showing detail of the hydraulic systems which operate the jack and wheel retractor mechanisms.

FIG. 1A is an enlarged view of a portion of FIG. 1 showing further detail of the hydraulic systems which operate the jack and wheel retractor mechanisms.

FIG. 2 is a side view of the structure shown in FIG. 1.

FIG. 3 is a partial plan view of the frame structure of the preferred embodiment with the wheels in a retracted position.

FIG. 4 is a side view of the structure shown in FIG. 3.

FIG. 12 is a partial perspective view of the tongue and coupler from the front.

FIG. 12A is a partial perspective view of the tongue and coupler from the rear.

FIG. 13 is a perspective view of the removable safety chain assembly of the preferred embodiment.

FIG. 14 is a perspective view of the retracted tongue and operating controls of the front panel of the frame structure of the preferred embodiment.

FIG. 15 is a side view of one hydraulic jack assembly of the frame of the preferred embodiment showing the jack in its retracted position.

FIG. 16 is identical to FIG. 15 but shows the jack in its extended position.

FIG. 17 is a plan view of the fulcrum arm of the jack assembly of FIGS. 15 and 16.

FIG. 18 is a side view of the fulcrum arm of the jack assembly of FIGS. 15 and 16.

FIGS. 22A-22H show, a sequence of operation in converting the trailer frame structure of the preferred embodiment from a towable roadable configuration to a retracted stationary configuration.

DESCRIPTION OF THE PREFERRED EMBODIMENT

Figure 5:
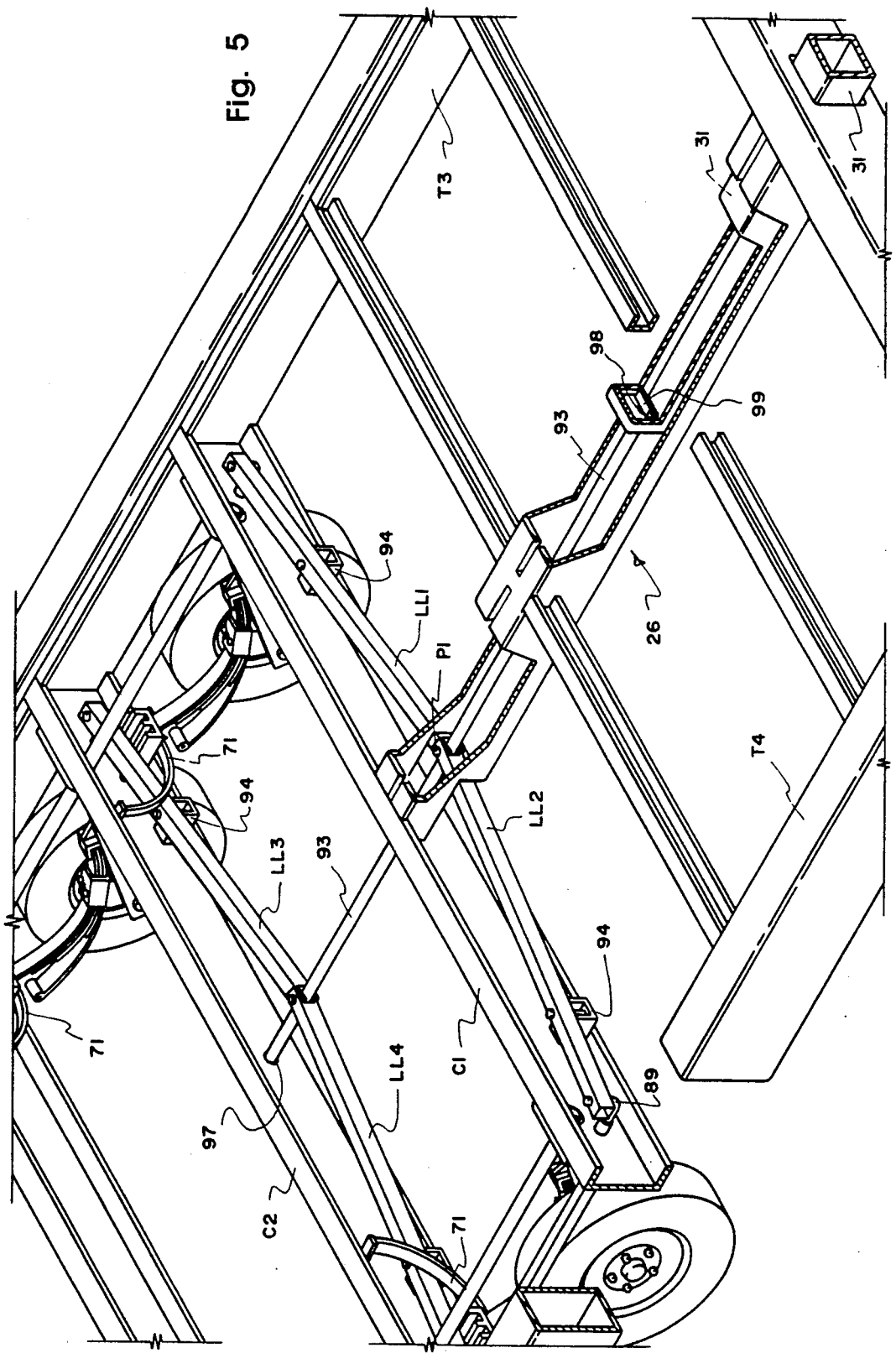
FIG. 5 is a partial perspective view from the front of the wheel suspension and retraction assemblies.

The trailer frame structure 12 comprises a rectangular structure having four sides formed by 4 by 7 inch steel structural tubes T1, T2, T3 and T4 and a plurality of transversely extending channel members including main channel members C1, C2 and C3 which are the principal supports for four swingable wheel assemblies W1, W2, W3 and W4.

The trailer is provided with three identical hydraulic jack assemblies J1, J2, J3, and one located at each forward corner of the trailer frame and the third located in the center of the rear of the frame. Each jack assembly comprises a channel shaped guide member 13 approximately 48 inches in length extending lengthwise of the trailer and opening downwardly. At the rear end of each channel guide member a fixed horizontal pivot 14 is provided for a fulcrum arm 16. At the opposite and front end of the channel, a forward stationary pivotable end of a reversible double-acting hydraulic piston assembly 17 is also fixed at a horizontal pivot point 18. The opposite and rearward end of the piston assembly is pivotably connected to an upper end of a jack lever arm 19 which is supported and secured within a horizontal track within the channel member by roller bearings which allow both linear longitudinal and pivotable motion of the upper jack lever arm end. The opposite and lower end of the jack lever arm is provided with a pivotable foot assembly 21 to bear against the ground surface as the jack is operated. The end of the fulcrum arm opposite the pivotable fixed end is pivotally connected at a fulcrum point near the midpoint of the jack lever arm. The fulcrum arm is approximately 14 inches in length. The length of the jack lever arm from center of the fulcrum pivot is approximately 12 inches to the pivot center on the upper end portion of the lever arm and 16 inches to the pivot center of the foot of the jack assembly. In order to provide a sufficient mechanical advantage at the beginning of motion of the jack assembly when it is in its fully retracted position, the fulcrum center on the jack lever arm is located slightly below a line passing through the centers of the pivot points at spaced upper ends of the jack lever and fulcrum arms. In use, the path of movement described by the foot of each jack approaches being exactly vertical in relation to the trailer, allowing the trailer to be raised and lowered in a vertical path. All pivot axles in the jack mechanism are kept parallel, horizontal and transverse to the length of the trailer and the structures therefore are of sufficient strength to provide side-to-side stability of the trailer as it is raised and lowered by the jacks. The breadth of the pivoted members can be seen from the representative fulcrum arm shown in drawing FIGS. 17-18.

The actual lifting force of each jack assembly is approximately one-fourth of the force supplied by the hydraulic piston assembly. Each hydraulic piston assembly has a diameter of 3.5 inches and a stroke of 12 inches and a rated operating pressure of 2500 pounds per square inch (psi). A suitable piston assembly is model SAE 9312A made by Prince Manufacturing of Sioux City, Iowa.

Each jack has hydraulic line connections for reversing the end to which hydraulic pressure is supplied to its piston for respectively raising and lowering the jack, the several lines to the jacks being connected in parallel by control means shown in FIG. 1 to preferably simultaneously operate all of the jacks. However, the control system may be constructed to also provide for selective operation of the jacks individually or in pairs along the ends or sides of the trailer for various leveling or wheel changing purposes. By lifting a corner or side of the frame, leveling feet may be approximately adjusted under the frame.

When fully extended the jacks exert sufficient force to raise the four corners of the trailer frame to uniform heights above a level ground surface with the tires of each of the wheel assemblies, when in their extended roadable positions, being sufficiently off the ground to permit inward and upward retraction of the wheel assemblies by operation of another hydraulic actuator 22 to retract the piston therein as described hereinafter so that each of these wheel assemblies is moved into a horizontal retracted position within the trailer frame essentially between the two parallel planes defined by the tops and bottom of the frame tubes T1-T4 and the trailer frame can then be lowered to rest on a flat surface. These spaced planes are approximately 7½ inches apart or separated by a distance which is selected by the frame components to provide a suitable step height from ground to the top usable surface of the trailer when the frame rests on the ground. The Uniform Building Code specifies that steps of a commercial structure should not exceed 7½ inches in height. The Building and Code administrators, International (BOCA) code specifies that, under various circumstances, the maximum riser height of a step should not exceed from 7 to 8¼ inches. It is practical in practicing this invention to have the step height comply with or be consistent with such code requirements for normal or standard stair step heights.

Figure 22D:
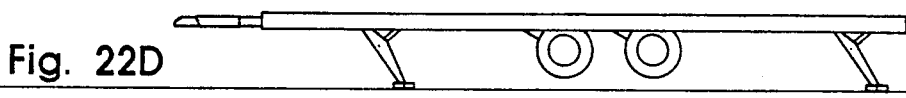
Figure 22E:
Figure 22F:
Figure 22G:

To prepare the trailer for transport after use in its lowered position, the jacks are again fully extended and the wheel assemblies actuated to their extended roadable positions by operating the hydraulic actuator to extend its piston. This is done by reversing the flow of hydraulic fluid to the actuator. The wheel assemblies are then locked in towing position by pulling a towing member 11 to its outermost position relative to the frame. The towing member can be locked in its towing position by the spring biased bell crank member 23 only when hole 102 in the towing member is aligned with a corresponding hole in its enclosing structure 26 to allow for entry of the pin 27 attached to the crank lever. The top of the pin enters the holes automatically under spring force. Thereafter the jacks are lowered permitting the trailer frame to drop until the tires support the trailer from the ground. The jacks are then further retracted by hydraulic controls and retracted to be totally concealed within the frame as seen in FIG. 22A.

The towing member 11 has a coupling member 28 welded to its forward end. This coupling member has generally flat sides and top with a ball socket under its forward end for connection to a conventional ball on the hitch of a towing vehicle. The sides and top wall of this coupler fit over the top and side walls of the towing member tube and add approximately ⅛" of thickness to the tube along the length of the coupler. Since the towing member is ultimately to be completely retracted with all portions including the coupler located rearwardly of the front face of the transverse tube structure T1, the opening in the transverse tube T1 is just slightly larger than the outer periphery of the coupler. In order to prevent transverse or vertical movement of the towing member tube 31 after the coupler is withdrawn from within the front opening in the trailer frame tube T1 to its extending towing position, the tube of the towing member had additional plates 30 of the same thickness as the added ⅛" thickness of the top and side walls of the coupler which are welded to the top and sides of the towing member tube at two points along its length. One point is at the very rear of the tube and the other is a point where the added plates fill the gap between the towing tube and the opening in the tube T1 when the towing member is in its towing or trailering position. The channel members 33 and 34 which form the receiver and which guide the forward/rearward sliding movement of the towing member between its towing and fully retracted positions are of such configuration that these added plates slide against the inner walls of the channel members and guide the towing member in its movements. These added plates keep the external surface of the towing member which lies outside of the frame in the towing position from contacting the sides of the aperture through which the towing member moves rearwardly when it is pushed to retraction and this prevents any scraping of the remainder of the exposed painted surface of the towing member.

As seen in FIG. 12 the towing member includes a surge type trailer hitch coupler assembly 36 for actuating the trailer brakes. This trailer hitch coupler allows approximately 1 inch of longitudinal travel between the ball end 37 and the rear end of the coupler. As the trailer is being towed, the coupler assembly is in tension and extends to its maximum length. Under braking by the tow vehicle, the compressive forces created on the coupler assembly causes it to compress toward its shortest length. These compressive forces are harnessed in a well known manner to operate a hydraulic piston to pressurize a hydraulic system to actuate the trailer brakes. A suitable surge actuator is the Model A-60 Hydraulic Brake Actuator manufactured by Unique Functional Products of San Marcos, Calif.

The primary hydraulic brake line 40 extends from the surge actuator through a steel container tube 39 approximately 1" square, which is anchored inside of and at the at the top of the trailer towing member assembly 11. This square tube is fixed to the tongue and forms a rearwardly extending parallel extension to the tongue member well beyond the rear end 38 of the tongue. Beyond the rear end of the hydraulic container tube, the hydraulic line is a flexible braid covered hydraulic hose 41 and extends rearwardly in a loop sufficiently large to take up an excess length of hydraulic line which amounts to the difference between the extended and retracted positions of the tongue. To support and store this excess when the towing member is retracted and stored within the trailer frame this loop passes around a horizontal pulley 42 approximately 4" in diameter which is spring biased with a coil tension spring 43 toward the rear of the trailer. An upwardly open fixed supporting channel 44 approximately 1 inch deep and 5 inches in width extends through the trailer crossmember C3 to provide a guide surface to direct the movement of the pulley and flexible hydraulic line as the tongue is moved between its retracted and extended positions. The forward end of the channel is provided with a transverse vertical portion 46 to serve as an attachment point for a hydraulic fitting to connect and anchor the fixed end of the flexible hose to a rigid brake line 47 secured to the trailer frame and extending to the brakes. The rigid hydraulic brake line on the frame extends to points near the front wheel assemblies and is connected at each swingable braked wheel by a shorter flexible line 48 to a rigid line 50 movable with the respective wheel-supporting trailing arm described elsewhere herein.

The rear end of the tongue extension is provided with an indexing bolt 52 which protrudes to serve as a stop against cross member C1. This stop prevents forward movement of the tongue beyond the towing position which might damage the brake line. This serves a safety function for the trailer in use and prevents damage to parts such as hydraulic the brake lines during assembly of the trailer.

The wheel mechanisms for supporting the trailer preferably have four wheel assemblies W1, W2, W3, and W4, two at each side of the trailer in tandem relationship. However, for varying loads and trailer lengths there may be either a single wheel assembly or three wheel assemblies in tandem at each side of the trailer.

Each wheel assembly of the preferred embodiment comprises a wheel 53 carried on a cantilevered axle 54 extending outwardly from a swingable trailing arm 56. The trailing arm is a rectangular tubular member which in the trailering position of the wheels is pivoted on a supporting plate 57 by means of a pin extending horizontally through the end of the arm and supported between parallel arm support members 58 extending rearwardly on opposite sides of the arm from the transverse wheel assembly supporting plate. The latter plate is swingable about a front to rear horizontal axis and may be locked with the wheel axis extending horizontally by means of locking pins 89 described hereinafter.

Each wheel assembly includes a mechanism for supporting the wheel which includes a multiple-leaf spring 61 supported on the upper surface of the 2 inch wide trailing arm. Each leaf spring has a base portion anchored at an acute angle with respect to the upper surface of the trailering arm within a short 2 inch square retainer tube 62 welded to the top surface of a trapezium shaped spacing support 63 having its lower surface weldably secured atop the trailing arm.

The partial leaf spring is 1¾ inches wide and passes through the retainer tube and the forward end of the spring is held in place by an inverted "L" shaped bracket 64 welded to the trailing arm. The top of each spring retainer tube is provided with two transversely spaced threaded holes for a pair of set screws 66 which are tightened to hold the spring leaves against the bottom of the retaining tube to help anchor the springs in place. A third central hole 67 accommodates a centering bolt which passes through the spring leaves and is threaded into the lower surface of the retaining tube.

The several leaves of the ¾ length leaf spring all terminate at one end at the same point a short distance in front of the retainer tube and are secured beneath an overlying inverted L-shaped bracket welded to the trailing arm and exerting a force toward the arm against the forward ends of the leaves to hold that end of the spring against the arm. When the wheel assembly is in its trailering position the other cantilevered end of the spring engages a stationary abutment or seat 68 carried by the frame to transfer a portion of the trailer weight to the spring and therefrom through the wheel assembly to the ground surface. Each of the seats for the free ends of the springs has been provided with depending lips 69 on either side of the spring end to help prevent any sideways movement of the spring end. The anchor member which overlies the cut end of the leaf spring is located a distance slightly less than the outer tire radius ahead of the wheel axis and reduces the stress applied to the spring retaining structure near the wheel axle and provides for space near the wheel assembly support plate for accommodating and accessing parts of the wheel assembly retracting mechanism.

A curved rigid steel strap guide 71 extending from the abutment seat is provided at the free end of the spring to prevent swinging of the trailing arm about its pivot axis on the supporting plate during and after retraction of the wheel assembly. The strap is shaped to maintain the arc defined by the fully extended free end of the spring as it swings during retraction of the wheel assembly to prevent interference between the free spring end and other structures. To the extent that the underside of the floor surface of the trailer may be provided with recesses to help accommodate the retracted wheel assemblies, each strap guide further insures that the respective wheel assembly and recess are properly aligned.

Retracting of each of the four wheel assemblies is achieved by pivoting their support plates 57 inwardly and upwardly so that the spring structure is moved up to a point adjacent the lower side of the trailer floor with the wheel hanging therebeneath with its axle essentially perpendicular to the floor.

No part of the wheel 53, the axle means 54, the trailing arm structure or other parts of the swingable wheel assembly extend outwardly beyond the side surface of the tire which faces outwardly during running so that the combined lateral dimensions of this overall assembly does not exceed about 7½ inches in the direction of the axis about which the wheel rotates whereby the assembly may be readily stored within the step-height thickness of the trailerable display platform with which it is used. All parts of the wheel and the swingable wheel assembly remain on the same side, i.e. below, the plane defined by the top frame portions, which plane is parallel to the flat roadway or supporting surface in both the roadable and retracted positions of the wheel. In its swinging movement between roadable and retracted positions, the wheel axis remains essentially in one plane which extends transversely of the trailer, perpendicular to the longitudinal direction of rolling trailer movement during highway towing. In the roadable position the wheel axis is fixed in a position parallel to the plane defined by the tops of the tubular frame portions.

Each of the wheel assembly support plates 57 has a vertical transversely extending flat surface which is in face-to-face sliding relationship with respect to a rear face flat surface of a transverse channel member of the trailer frame. The two wheel assemblies at each side of the trailer are interconnected for simultaneous actuation to and from their generally vertically extending trailering positions as seen in FIGS. 1 and 2 in which the wheel axles are generally horizontal. These wheel assemblies are movable to the retracted position of FIGS. 3 and 4 in which the wheel axles are generally vertical and in which the wheel assemblies are completely recessed within the stop height thickness of the trailer frame structure. When the wheels are in the retracted position, the distance from the tire sidewalls to the top of frame tubes T3 and T4 is greater than the distance from the top of the tire treads to the top of the frame members T3 and T4 when the wheels are in the trailering position.

The supporting plate for the front wheel assembly has a rearwardly extending round steel tube 73 welded thereto and a threaded opening slightly smaller in diameter than the internal diameter of the round tube. The threaded opening is coaxial with the tube to receive a shouldered threaded bolt 74 forming a pivotal support for the plate in a hole in the transverse frame channel member C1 which is faced by the forward face of the plate. The shouldered portion of the bolt closely fits within the hole and form a bearing support therein. The threaded portion of the bolt is screwed tightly into the plate with the threaded end extending into the round tube. The bolt shoulder engages the face of the plate to prevent the channel member from being immovably clamped between the bolt head and the plate to ensure that the bolt can freely rotate in the channel member.

The rear wheel assembly is similarly pivotably supported at the transverse frame channel member C2 which has a rear vertical face opposite the front vertical face of the plate. However, in this case the plate has a solid steel rod 76 extending therethrough with a forward end extending through a bearing aperture in the frame member and fitting closely with a telescoping slip fit into the rearwardly extending end of the tube of the front wheel assembly. The pivotal support for the two wheel assemblies is completed by an actuating tube 77 extending through a bearing support aperture in a transverse vertical wall of a third and rearmost main transverse frame channel member C3. The actuating tube telescopes with a slip fit over a rearwardly extending portion of the round rod.

The wheel assemblies are secured together for simultaneous operation by bolts 78 which pass through mating holes 79 and 80 in the tubes 73 and 77 and in the ends of the rod 76 respectively. A small coaxial collar 81 having an axial length to fill the space between the rear end of the front tube and the second frame channel member C2 may be slid over the rod to reduce the longitudinal load stress on the head of the bolt imposed by reward forces on the front wheel during trailering. The bolt, front tube, rod and rear tube are all coaxial and extend horizontally. If more support is needed to oppose longitudinal stress at the rear wheels the rear tube may be further supported by a removable abutment (not shown) attached to the transverse frame member C3 with a bearing nose projecting into or receiving the rear tube end. Removal of this abutment permits disassembly of the several coaxial members which pivotally support the wheel assemblies. The abutment cooperates with the aforementioned coaxial sleeve around the forward end of the rod to help oppose rearward forces of the plates caused by the rear wheel during trailering, these forces being transferred from the rear plate through the rod and the actuating tube to the removable abutment.

For each of the wheel assembly supporting plates there is a fixed stop member 82 anchored to the adjacent frame channel member with surfaces abutting and overlying the lower outer vertical edge of the support plate to limit the rearward and swinging outward movement of this edge portion when the wheel assembly is in its extended trailering position. The forward faces of the inwardly extending edges of the overlying flanges of the stop members are beveled to guide the edges of the supporting plates underneath the flanges as they are moved to the trailering positions. A stop 85 has also been provided on the support members for the trailing arms to engage the lower edge of the forward end of the trailing arms to prevent excessive downward movement of the arm when the trailer wheels have been lifted free of the ground and holds spring 61 against guide 71 during retraction and when being transported.

The wheel assemblies are actuated by means of a double acting piston assembly 83 having a fluid pressure operated piston with a piston rod extending from one end of the cylinder. A clevis connection 84 at one end of the cylinder is pivotably connected to a downwardly and outwardly extending crank arm 86 fixed to the actuating tube. In the trailering position of the wheels, the crank arm forms an angle of 45 degrees with respect to and outboard of a vertical plane through the axis of the actuating tube. The crank arm is movable through an angle of about 90 degrees in a transverse vertical plane to swing the wheel assembly to the retracted wheel position where the crank extends downwardly and inwardly at a similar 45 degree angle. The other end of the hydraulic actuator is similarly pivotably connected by a clevis connection 87 to a similar but oppositely acting crank arm similarly connected to the actuating tube at the other side of the trailer. The wheel assembly supporting and actuating mechanism at the other side of the trailer is a mirror image of that described above. Thus operation of the hydraulic actuator simultaneously operates the four wheel assemblies.

The double acting hydraulic actuator is provided with control means described hereinafter to retract or extend its fluid pressure operated piston to actuate the wheel assemblies after the trailer frame is raised to its maximum height above the ground by means of the jacking system.

Each of the wheel supporting plates has a hole 88 therein for reception of the end of a locking pin 89 which travels horizontally in a supporting sleeve carried on the face of the transverse channel member as seen in FIG. 5, the pin projecting through a hole in this face and into the hole in the wheel assembly supporting plate to lock the latter in a position where the wheel is fully extended for trailering. Each of the locking pins moves rearwardly to its locking position and is capable of being withdrawn from its locking position by being slidable within the sleeve by means of one of the four lever arms LL1-LL4. These lever arms operate in pairs and are pivotally connected at their inboard ends at two spaced points by pins P1 and P2 on a longitudinally extending rod 93 which is moved forward at the center of the trailer to actuate the pins to their locking positions when the wheels are extended. This same rod can be moved rearwardly in a manner described hereinafter for the purpose of withdrawing the pins from their locking positions.

The lever members LL1-LL4 are made of 1.5 inch square tubing, each with a length of approximately 44 inches and pivoted at a point on a pivot support structure 94 located about one-third of the distance from the outboard end to the inboard end with the pivot pin at this point having a vertical axis. The front to rear play at each of the pivot points along the length of the lever arms LL1-LL4 is minimal but the play longitudinally of the levers at these pivot points is sufficient to accommodate the pivoting movement of these levers notwithstanding that the transverse distance from the axis of the actuating rod to the axis of the locking pin remain the same at each wheel assembly.

The actuating rod 93 for the levers LL1-LL4 extends through centrally located holes in the main transverse frame members C1 and C2 and has a forward end which extends through a hole 98 in a rear end wall of the towing member. Within the towing member this rod has a transverse member 99 attached to it and positioned such that when the towing member is moved completely forward to a towing position this transverse member on the rod is pulled forward whereby the rod pulls the levers LL1-LL4 forward and causes the four locking pins 89 to engage in their locking positions at each of the four wheel assemblies. The wheel supporting plates at each wheel assembly cover the hole in the adjacent transverse frame member through which the locking pin would extend to a locking position so that in the event the wheel assembly is not moved completely to its operating or trailering position it is impossible for the towing member to pull the actuating rod sufficiently forward to engage the locking pins. This means that the towing member is kept in a partially retracted position and an appropriate interlocking arrangement described hereinafter provides a warning to the operator that it is unsafe to lower the jacks because the wheel assemblies have not been moved to their locked positions.

At the time when the trailer is moved to a position where it is going to be converted from its trailering configuration to its non-trailering configuration, the towing member is in a fully extended forward position and is releasable to be moved to a retracted position after the jacks are fully actuated to their extended positions by pulling on a manual control member 101 located in the control recess in the front wall of the tubular structural member T1. This control member is pivotably attached to one end of the spring-biased bell crank member 23 and the other end of the bell crank is pivotably attached to a rod 27 which goes through the hole in the wall of a towing member receiving structure 26 formed by a pair of longitudinally extending channel members which have their open sides spaced just enough to form a long box-shaped passage within which the towing member can slide between its towing and retracted positions.

When the towing member is in its towing position hole 102, in the towing member, is in registry with the hole in the receiving structure to permit the pin 27 to enter the towing member hole and lock the towing member in its towing position. Pulling on the control member against the spring bias releases this locking pin from the towing member and allows the latter to be moved rearwardly to be totally enclosed within the tubular structure formed by the two channel members which extend between the transverse frame member T1 and the transversely extending channel member C1 on which the forward pair of locking levers LL1 and LL2 are pivoted.

When the towing member is manually moved rearwardly after release of its locking pin, the locking actuator rod remains stationary during initial rearward movement of the towing member until the rear end of the towing member impacts against the inner pivotably connected ends of the levers LL1 and LL2 and drives them rearwardly whereupon the pivoting movement of these levers causes their outer ends to move forwardly and withdraw the locking pins 89 from their locking positions in the wheel assembly plates. This movement of the inner ends of the forward pair of levers LL1 and LL2 is simultaneously transferred by the actuating rod to the center of the rearward pair of levers LL3-LL4 to similarly pull the locking pins from the rear wheel assembly plates 57 at each side of the trailer. In this position, a second hole 103, passing completely through the towing member toward the front thereof, is in registry with the hole in the receiving structure, allowing the pin 27 to enter the towing member hole and lock the towing member in its retracted position. This second hole 103 also provides a means for attachment of a safety chain to the towing member when the towing member is in the towing position. As discussed further below, when the pin 27 is engaged in either of the holes in the towing member, the control member becomes retracted, allowing a front cover plate to be closed.

As seen in FIGS. 12 and 13 a pair of safety chains 152 for connecting the trailer to a towing vehicle are attached to a steel tube 154 which is detachably secured to the towing member 11. At one end of the tube a small chain link is welded to the tube in a manner to enable that end to be passed through holes 103 in opposite sides of the towing member at its front end near the coupler. A larger chain link at one end of one safety chain is welded to the other end of the tube in a manner to prevent the tube from passing completely through the holes. A large snap link 153 on the end of the other safety chain is connected to the small chain link on the tube to prevent its inadvertent withdrawal from the towing member.

In the event it is necessary to remove the towing member or the actuating rod for servicing, it is merely necessary to disconnect the flexible hydraulic brake line and indexing bolt 52 at the rear end of the container tube and the pivot pins P1-P2 which connect the inboard ends of the levers LL1-LL4 to the rod, whereupon the rod and towing member can be completely removed from the trailer frame through the opening in the front face of the tube T1. Thereafter the rod can be slid forward and removed from the front end of the towing member at a point just below the forward end of the coupler.

A "four way closed-center" valve V1 is used to provide reversible hydraulic control of the actuators of jack assemblies J1, J2 and J3. This valve provides for selectable hydraulic flow in either one of two opposite directions or for a complete cessation of flow and "blocking" of the hydraulic system. A similar valve V2 is used to provide reversible hydraulic control of the actuator for the wheel retraction assemblies.

All hydraulic system are driven by a single electric hydraulic pump 111 having a suitable fluid reservoir, such as a Model 1070 manufactured by the J. S. Barnes Corp., with an operating pressure of 2000 psi. The operating pressure of the jack assemblies is of the order of 800 psi. As a safety measure, in order to insure that the wheel retraction mechanism cannot be operated except when the jacks are fully extended, the hydraulic system for the wheel retractors is fed by a relief valve V3 from the hydraulic circuit from the jack assemblies. This valve V3 is set to open at, for example, 900 psi. With the relief valve setting greater than the normal operating pressure of the jacks, no hydraulic flow is available to the wheel retractors until the piston assemblies for the jacks are fully extended, causing a buildup of hydraulic pressure beyond that ordinarily developed during the jacking operation.

In order that the trailer frame can remain level while being raised and lowered, the hydraulic line feeding the two front jack assemblies is fitted with a proportioning valve 112 to insure that the respective jacks are fed equal volumes of hydraulic fluid. Each jack has an adjustable safety flow control valve 113 to prevent the jack from lowering unsafely fast in the event of a hydraulic line failure. Such a manually adjustable control valve is located in the line feeding the single rear jack assembly to also allow its operation to be manually adjusted and set to match the jacking rate of the two front jack assemblies. These valve adjustments can also accommodate variations in weight distribution of the trailer and its accessories, while still providing uniform jacking or lifting heights for level operation of the trailer during raising and lowering movement.

The control system as seen in FIG. 1A comprises a group of interconnected hydraulic lines and valves carried by the trailer frame for operating the hydraulic jacks J1, J2, and J3 and the hydraulic wheel retractor 22. To raise the trailer and retract the wheel assemblies the electric motor driven hydraulic pump 111 supplies hydraulic fluid through a pressure line L1 to jacking control valve V1. When this valve is in its lifting position fluid flows from one port thereof to line L2 which is connected to a proportional divider 112 having lines L3 and L4 connected through safety valves 113 to the extension lifting ports of front jacks J1 and J2. Expelled fluid from the other ports of jacks J1 and J2 returns to the return side of the pump through line L5, a manifold 117, line L6 back to valve V1 and via return line L7. Another line L8 connected to line L2 supplies fluid to the lifting port of the rear jack J3 and the expelled fluid therefrom returns via line L9 to line L6 and back to the pump as described. When the trailer is fully raised the pressure in line L2 rises substantially above the operating pressure of the jacks and exceeds the threshold relief pressure of relief valve V3 whereupon fluid can flow therethrough to line L10 and to retraction control valve V2.

With valve V2 operated to its wheel retraction position, and the jacks fully extended, fluid then flows from the retraction port thereof via line L14 and L13 to the retraction port 161 of the retraction actuator. Expelled fluid from the other port of this actuator returns via lines L12 and L11 to the other port of valve V2 and therethrough to return lines L15 and L7. When the retraction actuator is fully retracted the pressure rise therein is limited by the relief valve V5 which allows fluid to escape from line L14 to line L11.

Similarly, with valve V2 operated to its wheel extension position, and the jacks fully extended, fluid then flows from the extension port of valve V2 via lines L11 and L12 to the extension port 162 of the retraction actuator. Expelled fluid from the other port of this actuator returns in this case via lines L13 and L14 to the other port of valve V2 and therethrough to return lines L15 and L7. When the retraction actuator is fully extended the pressure rise therein is limited by the relief valve V4 which allows fluid to escape from line L11 to line L14.

A fully sealed "deep-cycle" automotive type battery 131 provides sufficient power to operate the hydraulic systems for several cycles of jacking and wheel retraction and jacking and wheel extension. The system connected between a battery energy source and operating motive devices for frame jacking and wheel retraction is energized through an electric safety switch 132 under control of a knob 133 located in a recess 134 in the front frame member T1 as described more fully below. The battery is capable of being recharged through a normal electrical connector 144 also on the front of frame member T1, and required for lights and other accessories when the trailer is attached to a tow vehicle. While automotive batteries, when oriented normally, are typically greater in height than the approximately 7.5 inch height of the trailer frame of the present invention, the use of a fully sealed battery, such as a 12 volt Gates Optima 650 battery having dimensions of 6½×7 13/16×9 11/16 inches and manufacture by the Gates Company of Denver, Col., allows using a relatively large single battery mounted on its side to readily fit within the limited height available.

FIG. 14 shows the front end of the trailer frame with the towing member totally recessed or retracted therein. A second electrical connector 146 is provided to supply 110 volt power for a battery charger and any other accessories on the trailer. The electrical connector 144 is a conventional low voltage connector for running, stop and turn lights as well as battery charging while the trailer is being towed. In a recess in the front frame member and coverable by a lockable hinged plate 147 is a push-pull safety switch 132 having an actuating knob 133 which is pulled to close the switch. The safety switch 132 is part of the electrical circuit to the hydraulic pump motor, and is in series with a limit switch 136 located at valve V1. The limit switch opens or closes in response to actuation of the control lever of valve V1. Thus, with the safety switch closed the limit switch activates or deactivates the hydraulic pump. When pulled to an extended position, the actuating knob interferes with closure of the hinged plate and causes the switch to be turned off by contact between the knob and the plate if the plate is closed. Another manually operable pull knob 135 is on the end of a rod which is connected to the spring biased bell crank member. As described above, the spring biasing force on the bell crank tends to move this pull knob to its "pushed in" or retracted position and moves the bell crank to a position in which it locks the towing member in place, but only when the towing member is fully extended or fully retracted. Because of the complete interdependence of the movement of the wheel retractor locks and the movement of towing member during engagement or release of the wheel retractor locks pins, the towing member can only be fully extended when the wheel assemblies are properly locked in the extended position. At any other time the knob remains pulled out and keeps the closure plate open as a warning that the towing member is not ready for towing. In another covered recess 140 in the front frame member with a lockable hinged closure plate 150 are located the operating handles for mechanically actuating the hydraulic control valves by means of bowden cables 139 and 141 extending from the handles to control levers 137 and 138 located on the respective valves. Handle 142 for the jacking control valve V1 has three positions and is spring biased to the center or neutral position. Its outermost position provides for trailer lowering, a central position shuts the valve completely and its innermost position effects extension of the jacks. This handle is prevented from being in its outermost position when the hinged plate is closed. This, in turn, prevents the valve from allowing the jacks to drop by gravity during trailering by keeping the handle away from its trailer lowering position. Handle 143 is a three position direct actuator for the retracting control valve.

Near the center of each of the longitudinal sides of the trailer frame a rectangular hole is made passing through the tube structures T3 and T4 to accommodate recessed side lights. These holes are made by cutting rectangular holes in the side walls of tubes T3 and T4 and extending a tubular member from one wall to the other of each tube T3 and T4 and completely welding the periphery of the ends of this added tubular member to the edges of the holes in tubes T3 and T4. Particularly in the alternative embodiment described below, the integrity of the air chambers within the tubes T3 and T4 is preserved without any escape of air at these passages for the lights.

Similar passages are provided in the rear tube T2 within which are mounted electrical receptacles into which removable taillights and license plate supports can be connected and supported by latch mechanisms for operation of the trailer on the highways. In the air operated alternative embodiment described below these passages are located in the unpressurized area between the welded transverse plates 166 and the mitered corners 167. A centrally located light bar is magnetically attached to the rear frame and electrically connected with an external cable to a removable taillight. Removable taillights are connected both mechanically and electrically with a standard Pollack 5-pin socket connector.

Figure 23A:
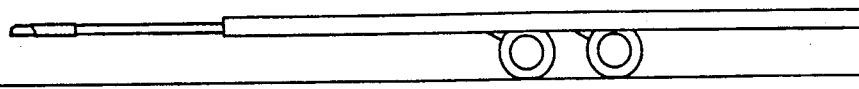
FIGS. 23A-23H show, a sequence of operation in converting the trailer frame structure of an alternative embodiment from a towable roadable configuration to a retracted stationary configuration.
Figure 23B:
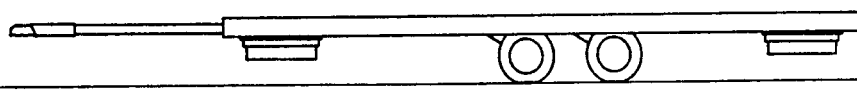
Figure 23C:
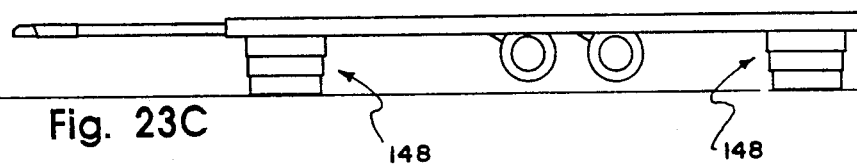
Figure 23D:
Figure 23E:
Figure 23F:
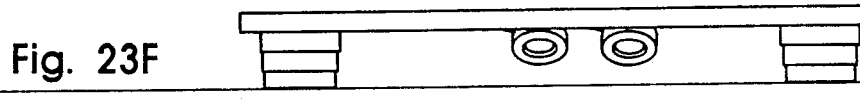
Figure 23G:
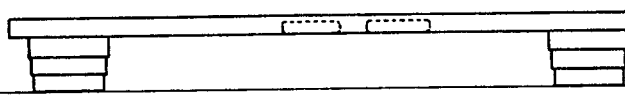
Figure 23H:

As seen in FIGS. 22H and 23H, the profile of the totally retracted trailer is very small. The flat upper and lower faces of the trailer make it very easy to transport by merely stacking a number of trailers on top of each other.

A wooden floor of approximately one inch thickness forms the upper surface of the trailer and is supported throughout the area of the trailer within the perimeter defined by the main structural tubes T1-T4. This floor is supported by the various transverse and longitudinal inner trailer frame members and is further supported around the periphery of the frame by an angle member providing a small ledge extending about 1" in from the periphery of the trailer frame along each of the tubular members T1-T4 and approximately 1" below the top of the frame defined by these tubular members T1-T4. Although the wooden floor of the trailer has a thickness of one inch over essentially its entire surface, it may be cut away over a narrow area directly above the trailing arm to a thickness of one-fourth inch with a thin 0.05 reinforcing metal plate thereover. Over the small area directly above the wheel supporting plate and the shoulder thereon which pivotably supports the trailing arm the wooden floor may be entirely cut away and only a thin 0.05 plate used at the upper floor surface. These cut away areas minimize the maximum overall height of the frame which can be kept to 7.5 inches or less. The Goodyear Highlander 4.80×12 tire used with this invention has an inflated width of 5.1 inches which leaves very little room for the supporting structure and clearance at the side of the wheel. A small portion of this tire width may extend below the frame in the retracted wheel position since the downwardly facing tire sidewall, which faces outwardly in the roadable wheel position, may deform upwardly 0.18 inches when the trailer frame rests on a smooth flat surface without any other part of the wheel contacting this surface.

The frame of the trailer is typically supported by the wheel assemblies to run at about 15 inches above the road surface. During jacking abutment stops 85 at the pivoted end of the trailing arm limit the downward movement of the tire to a maximum of about 18 inches below the frame. Full extension of the jacks raises the trailer frame a distance of 20 inches above the road surface.

Figure 10:
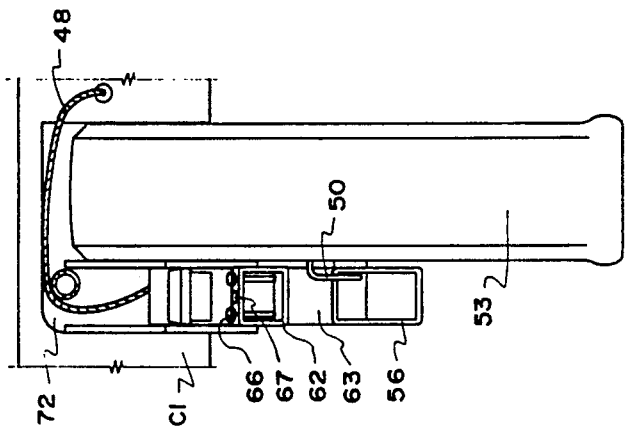
FIG. 10 is a view from the rear of the structure of FIG. 9 with the leaf spring omitted for clarity.
Figure 9:
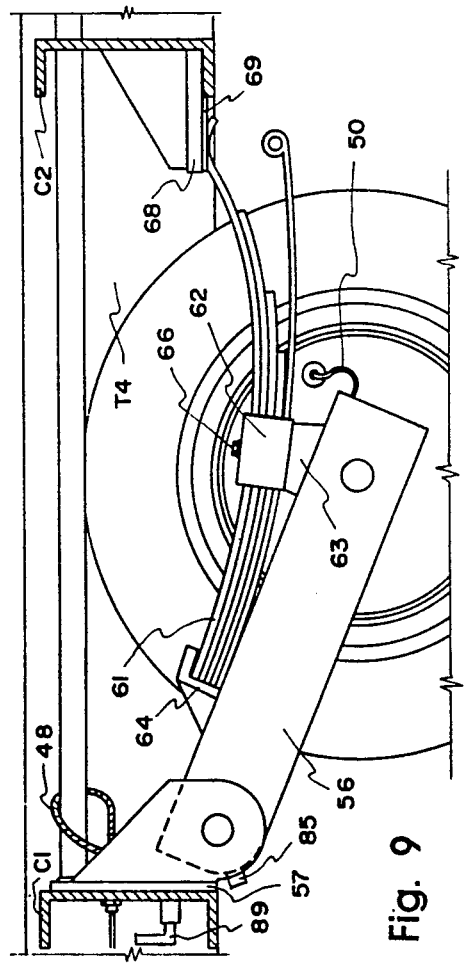
FIG. 9 is a side view of the leaf spring suspension assembly for one wheel on the left side of the trailer of the preferred embodiment.
Figure 11:
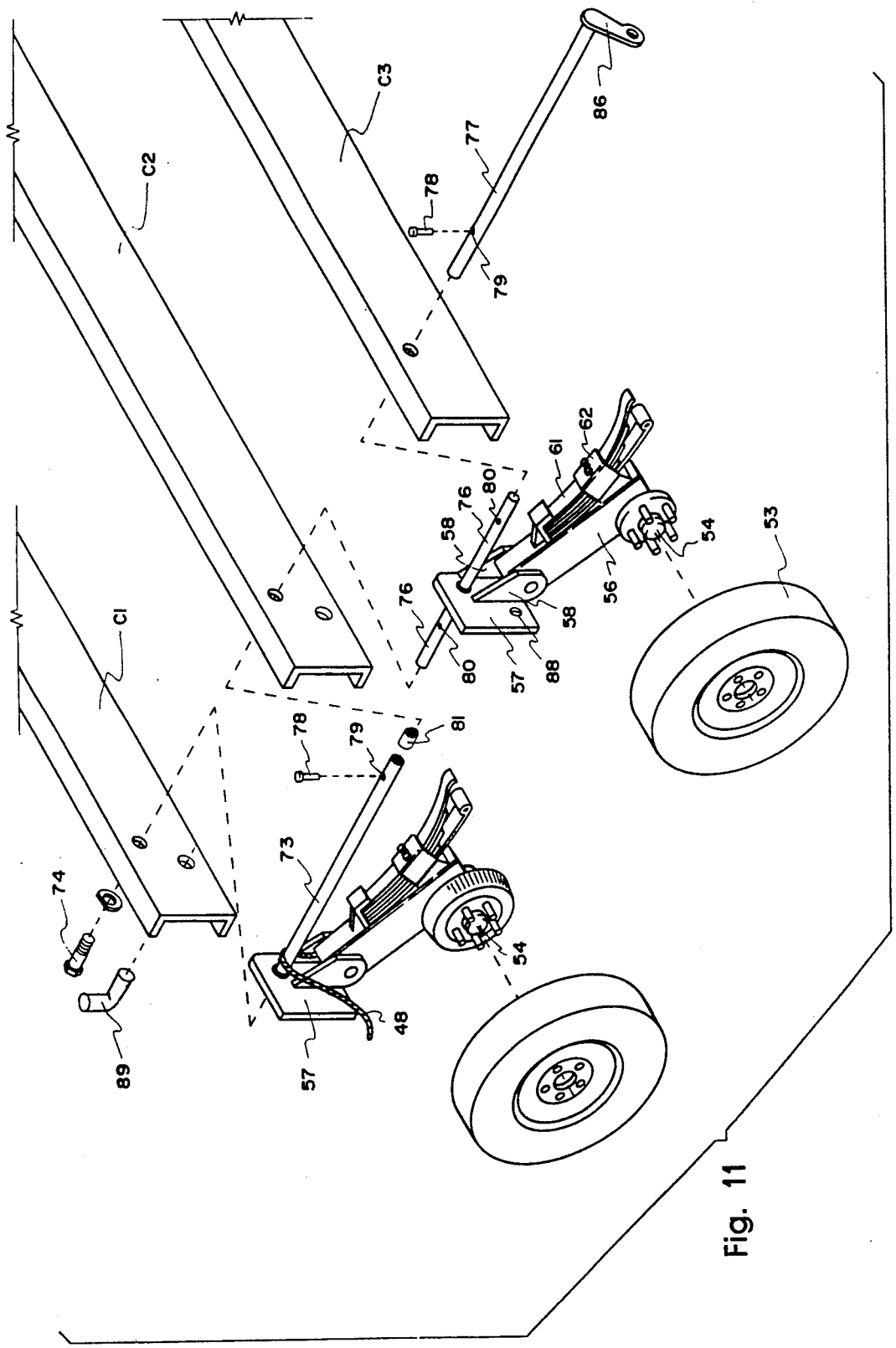
FIG. 11 is an exploded view of the pivotable wheel suspension and retraction assembly for the left side of the frame of the preferred embodiment.
Figure 21:
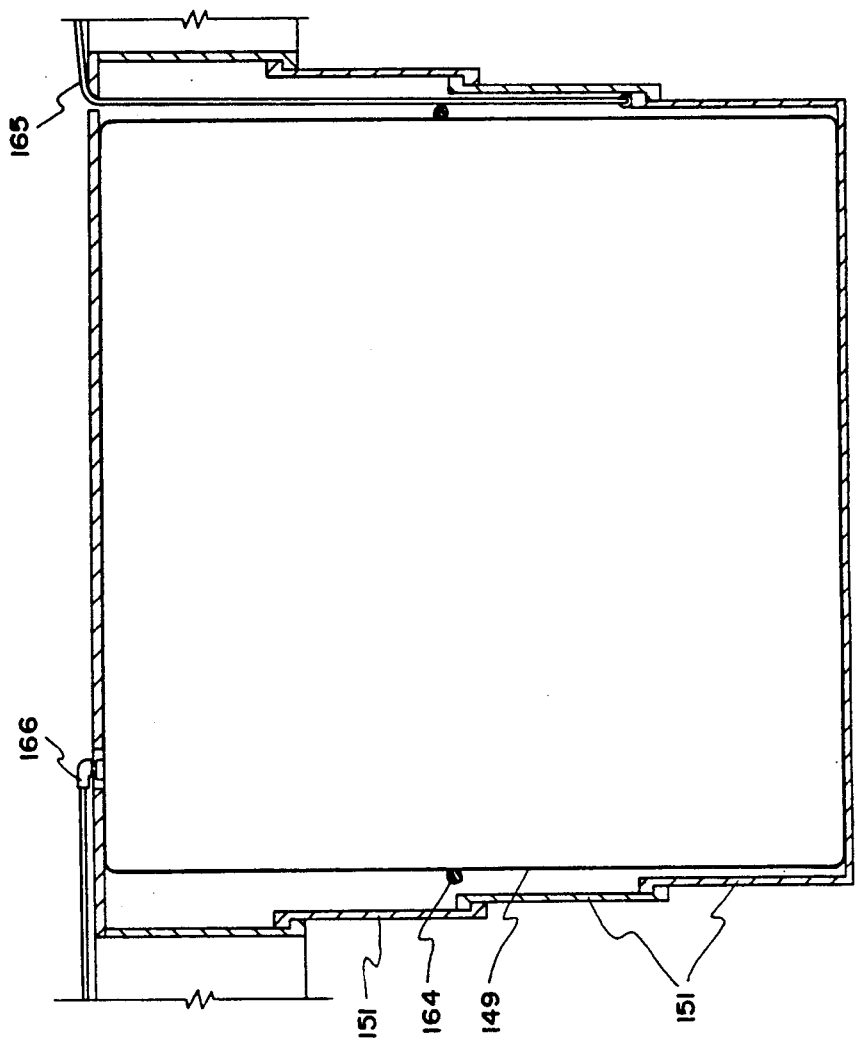
FIG. 21 is a cross-sectional view of the expandable air bag and telescoping air bag retainer lifting assembly of an alternative embodiment with the lifting assembly in an extended position.

As seen in FIGS. 9 and 10, showing the right forward swingable wheel assembly, the tire tread of wheel 53 in the roadable position of the wheel is near or about the same height 72 as the longitudinally and rearwardly extending tube 73 welded to the support plate 57 (see exploded structure of corresponding left assembly in FIG. 11). This tread portion is horizontally directly between the longitudinally extending pivot axis of tube 73 and the inner wall of tubular frame member T4. Because of this high position of the tread within the trailer frame, the overall roadable height of the trailer frame is made very low. The distance from the top horizontal plane of the trailer frame to the lower outer sidewall surface of the tire in the retracted position is accordingly greater than the distance of this top plane to the tire tread when the wheel is in its roadable position. The lateral offset of the longitudinal pivot axis just to the inboard side of the wheel 53, and above the trailing arm 56 which is in close proximity to the inboard sidewall of the wheel and tire, enables the wheel assembly to not only be kept totally within the inner walls of tubular frame members T3 and T4 as seen from above, but also to be kept within the vertical height of these tubular members when the wheels are in their retracted positions with the frame resting on a flat supporting surface.

Figure 9A:
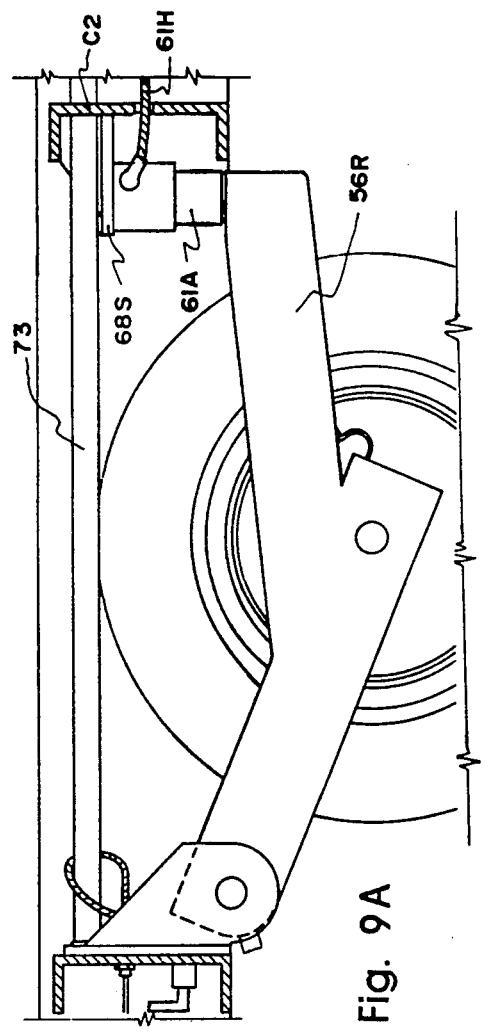
FIG. 9A is a side view of the air spring assembly for one wheel on the left side of the trailer.

An alternative embodiment shown in FIG. 9A for the spring suspension in place of the leaf springs 61 is to provide for each of the pivoted wheel supporting means at each side of the trailer a similarly pivoted but rigid trailing arm structure 56R of a length and location similar to the combined configuration of the trailing arm 56 and leaf springs 61 described above but extending further to the rear past the tire. A flat upwardly facing end of such a rigid arm 56R is positioned at the level of the bottom of the frame for engagement with the lower face of an upwardly compressible air spring 61A located at approximately the same location as the spring abutment seats 68 as seen in FIG. 9. Such air springs 61A, one of which is shown for one wheel in FIG. 9A, have a stationary supporting portion 68S anchored to the frame as at the main transverse channel members C2 and C3 and are configured to straddle or fit around or under the longitudinal tubes 73 and 77 and rod 76 which define the pivoting axis of the wheel retracting assembly. Such a spring may be made up of two smaller air springs on opposite sides of that pivot axis and bridged therebeneath by a member engageable by the rear end of the rigid trailing arm 56R. Plural air springs for multiple wheels at one side of the trailer are pneumatically interconnected by means of an air line hose 61H to provide load balancing as the wheels at that side are deflected differently by road or surface irregularities during movement of the trailer, particularly over very uneven surfaces such as curbs at low speeds.

An alternative embodiment to the hydraulic system for operating the jacking and wheel retracting mechanisms uses a pneumatic system having as its energy source a reservoir of compressed air and jacks operated by compressed air and a compressed air operated actuator for retracting and extending the wheel supporting assemblies. Such devices may be lighter because of the omission of hydraulic fluid and hydraulic pump, but the actuators are some what more bulky because they operate at a relatively low pressure. However, in certain locations, such as a carpeted showroom, the assurance of no leaking hydraulic fluid may be a big advantage.

Figure 19:
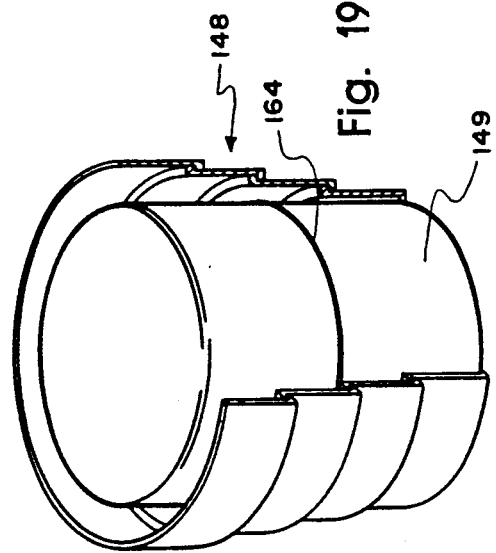
FIG. 19 is a perspective view of the expandable air bag and telescoping air bag retainer lifting assembly of an alternative embodiment with the lifting assembly in an extended position.
Figure 20:
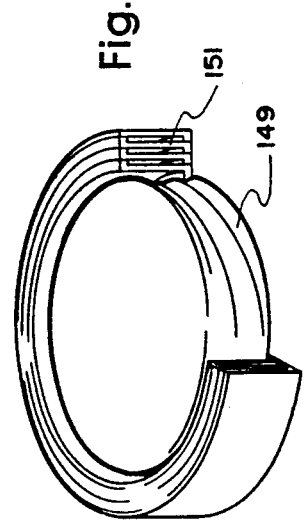
FIG. 20 is a perspective view of the expandable air bag and telescoping air bag retainer lifting assembly of an alternative embodiment with the lifting assembly in a retracted position.

Such a system may use essentially the same frame, wheel suspension, wheel retraction, towing member and safety interlocking concepts described above in connection with a hydraulic system with principal differences being that: (1) each hydraulic jack is replaced by an air bag jack assembly 148 as shown in FIG. 19; (2) the hydraulic system and controls therefor as described in connection with FIG. 1 are replaced with a pneumatic equivalent as will be described; (3) the hydraulic retraction actuator is replaced by a similarly configured double acting air cylinder and piston structure; and (4) the trailer frame, which in the hydraulic embodiment is primarily a supporting structure, is constructed so that almost the entire peripheral frame structure, made up from 4 by 7 inch steel structural tubes, is configured to form one or more pressurized gas reservoirs to operate the wheel retractor and the jack at different pressures. Shown in the drawings in representation of such a trailer structure providing a platform approximately 18 feet in length by 8.5 feet in width in which approximately 83% of the peripheral length of main tubing is usable for air reservoirs. For a similar structure 10 feet in length by 8 feet in width the usable reservoir proportion of peripheral tubing is approximately 75%. In general, it is within the spirit of the invention to have from 60% to at least 90% of the length of main tubing members available to serve as one or more air reservoirs.

In this embodiment there is supported at each front corner and at the rear center within the trailer frame an air bag jack assembly 148 comprising a generally cylindrical air bag 149 of strong flexible air-impenetrable material enclosed by a stabilizing shell comprising a plurality of nested telescoping members 151 made of strong thin rigid shock-resistant metal or resin-impregnated plastic or like material. From top to bottom the peripheral walls of the telescoping members decrease in diameter and form a protective shell or enclosure so that at any amount of inflation of the bag any foreign material such as water or dirt tends to fall to the outside thus minimizing the entry of such foreign material to the area of the air bag. The telescoping members bear upon each other during inflation and deflation of the bag over a sufficient vertical extent, and with surfaces that are of a material or so coated as to minimize friction to prevent binding, so that when the bag is partially inflated the bag is horizontally stabilized keeping the round top of the bag directly over and parallel to the round bottom thereof. This minimizes any horizontal movement of the trailer frame during jacking operations.

Figure 6:
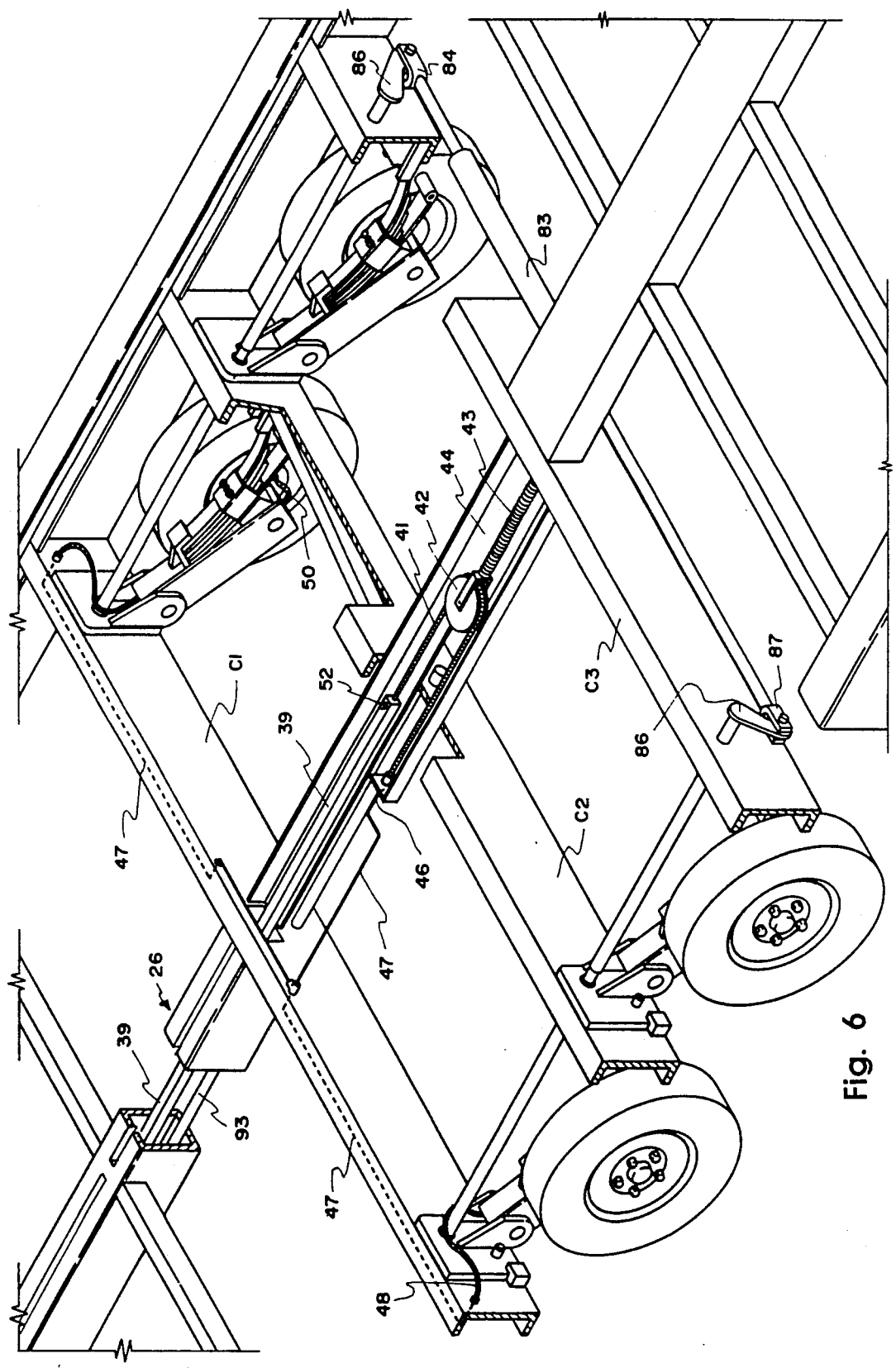
FIG. 6 is a partial perspective view from the rear of the wheel suspension and retraction assemblies showing detail of the retractable hydraulic brake line.
Figure 7:
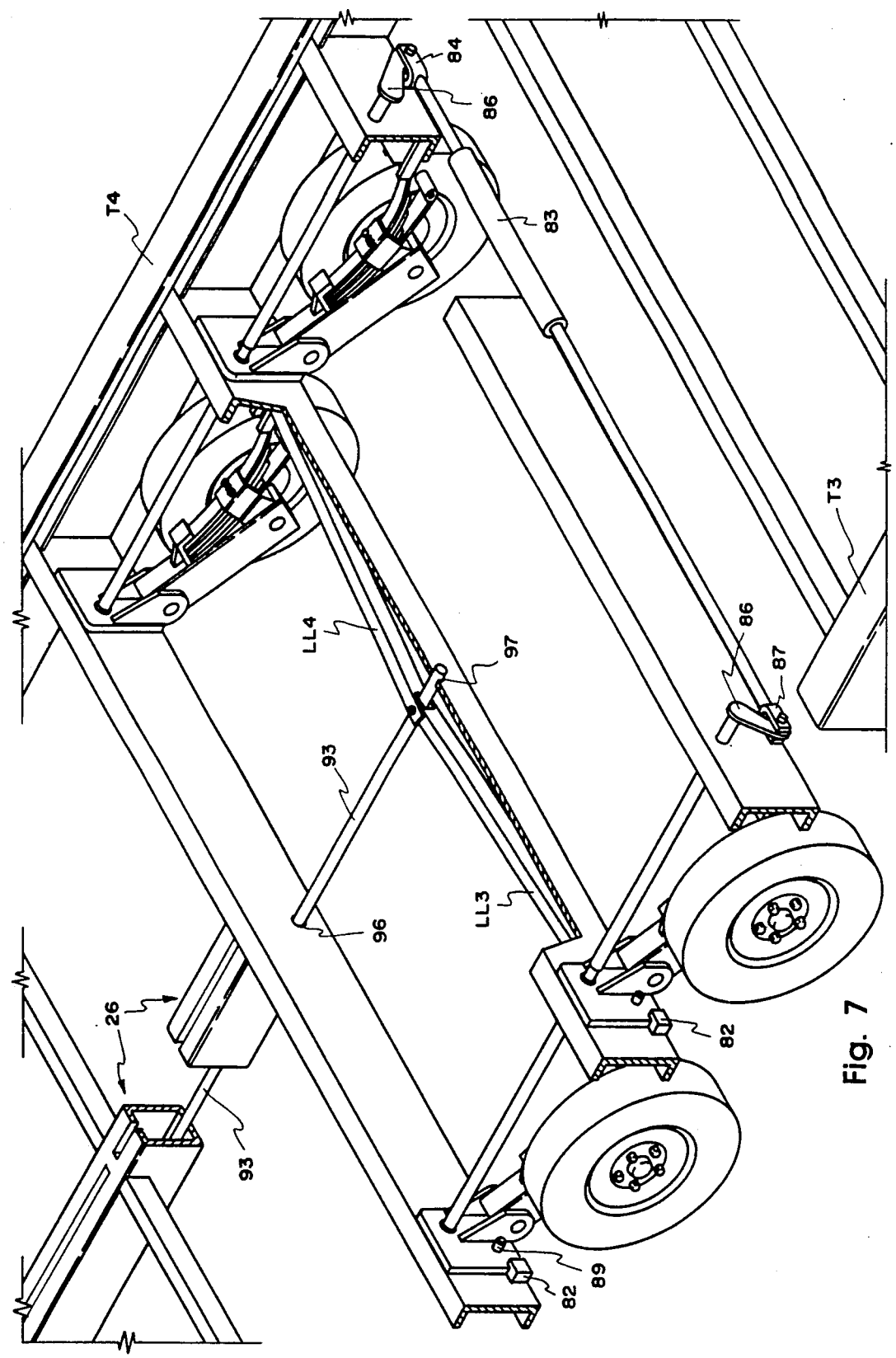
FIG. 7 is a partial perspective view from the rear of the wheel suspension and retraction assemblies showing detail of the latch mechanism for the wheel retractor assembly.
Figure 8:
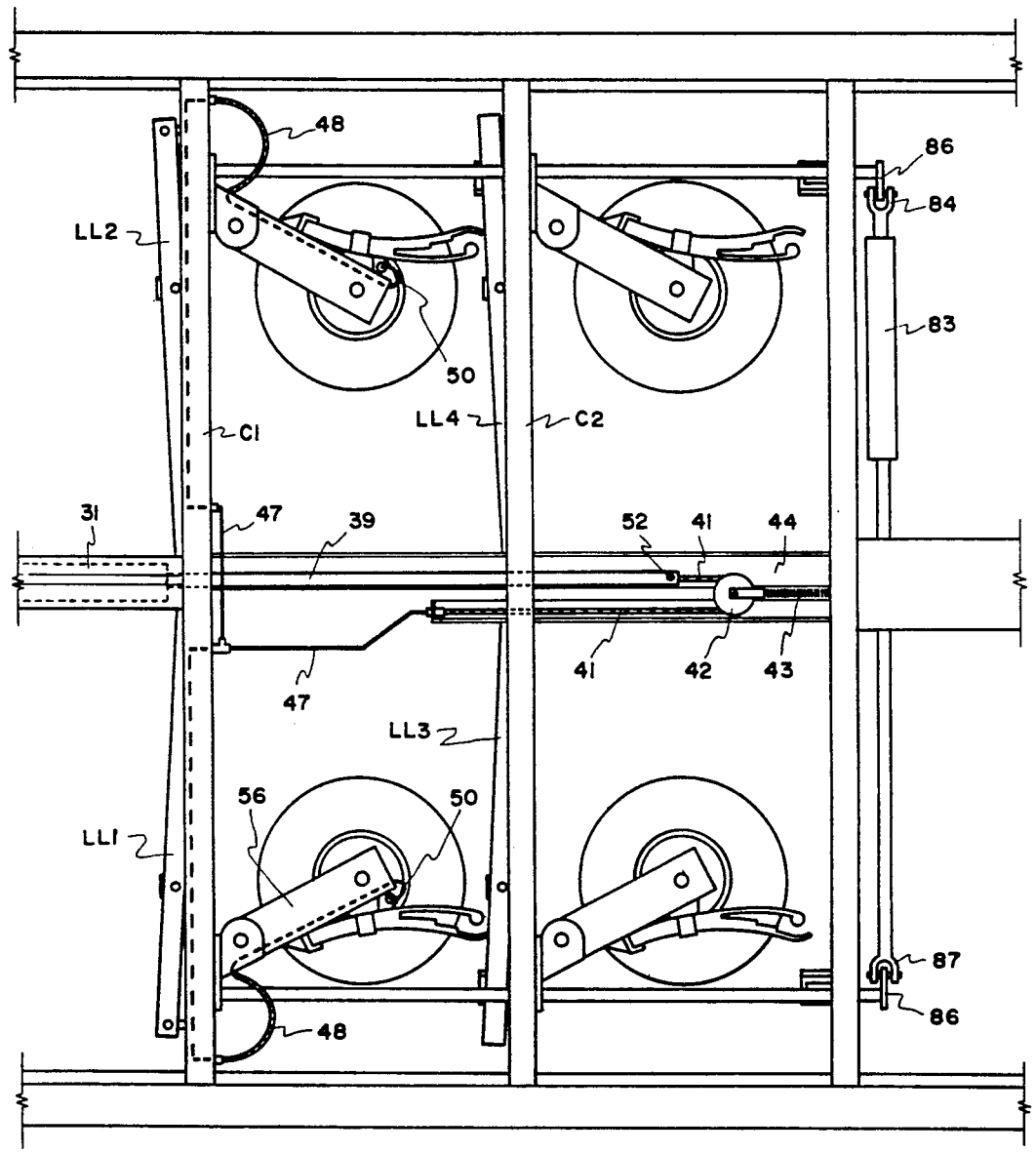
FIG. 8 is a partial plan view of the frame structure of the preferred embodiment with the wheels in a retracted position showing detail of the retractable brake hydraulic line.

The air bag has a diameter of about 20 inches and an inflated length to provided a vertical lifting range of 20 inches when totally inflated. Each top member of the telescoping shell is connected to and supported by a pair of 2×2 inch channel members extending at approximately 45 degrees to the frame tubes across the inner front corners of the frame just beneath the floor of the trailer. The rear center air bag is similarly supported by similar channel members at the same location as the rear hydraulic jack in FIGS. 1 and 6. The round upper flat end wall is adhesively secured over its entire surface to the top shell member and the round bottom end wall is similarly secured over its area to the bottom shell member.

Each bag has an air hose connection 166 for inflating and deflating the bag, the several air hoses being connected in parallel by control means to preferably simultaneously operate all of the bags. However, the control system may provide for selective operation of the bags individually or in pairs along the ends or sides of the trailer for various leveling or wheel changing purposes. By lifting a corner or side of the frame leveling feet may be appropriately adjusted under the corners of the frame. Like the hydraulic system the air bag jacks are raised by supplying a pressurizing fluid in the form of a gas to the bags. However during lifting there is no expelled fluid to be concerned with. For lowering it is merely necessary for the air hoses to the bags to be controllably vented to the atmosphere for controlled deflation which occurs due to trailer weight until the frame is supported by the wheels or directly upon the ground.

When fully inflated the bags exert sufficient force to raise the four corners of the trailer frame to uniform heights above a level ground surface with the tires of each of the wheel assemblies when in their extended positions being sufficiently off the ground to permit inward and upward retraction of the wheel assemblies so that each of these assemblies can be positioned within the trailer frame essentially between the two parallel planes defined by the tops and bottoms of the frame tubes T1–T4. These spaced planes are approximately 7½ inches apart or separated by a distance which is selected by the frame components to provide a conventional or standard step height from group to the top usable surface of the trailer when the frame rests on the ground.

With the trailer frame supported by the extended air bags to raise the wheels off the ground, a double-acting pneumatic actuating means for the wheel assemblies is operable to retract the piston and the wheels assemblies by suitable controls which supply air from the frame reservoirs at a regulated pressure of approximately 50 psi via a first valve connected to one side of the piston of the pneumatic piston device with a second valve connected at the other end of the device and open to allow air to escape to the atmosphere from the opposite side of the piston. The function of the first and second valves is reversed to cause the wheel assembly actuator to move the wheels to their extended or roadable positions. Thereafter, the air bags are controllably deflated allowing the trailer frame to be lowered at a safe rate to rest on the ground or supporting surface or to be supported thereon by the extended wheel assemblies.

During raising or lowering of the frame the air bags are kept from being caught or pinched between the telescoping peripheral walls of the shells by means of one or more elastic cords or bands 164 around the center of the cylindrical bag walls which retract these walls radially inwardly when fully or partially deflated.

To prepare the trailer for transport after use the air bags are again fully inflated and the wheel assemblies actuated to their extended positions by operating the pneumatic actuator to extend its piston. This is done by admitting compressed air to the other end of the piston via the second valve and allowing air to escape via the first valve. The wheel assemblies are then locked in towing position as in the principal embodiment by pulling the towing member to its outermost position relative to the frame and locking it in its towing position. Thereafter the air bags are deflated permitting the trailer frame to drop until the tires support the trailer from the ground. The air bags are then further deflated and retracted by vertically extending bungee or spring operated tensioning cords 165 located within the shells at a plurality of points therearound to pull the lower shell member upward to totally collapse the bags and pull the shells together. Alternatively, a 12 volt pump which may be used to pressurize the air jack and/or the pressure tanks may be used to evaluate the air from the air jacks thus allowing atmospheric pressure to collapse the bags and pull the shells together and a suitable latch provided to retain the lower shell.

Most of the peripheral frame of the trailer frame formed by the structural tubes T1-T4 is constructed to form one or more air chambers around this periphery to hold a sufficient quantity of compressed air to permit several operations of inflation of the air bags and appropriate operation of the pneumatic cylinder to retract or extend the wheels so that the trailer structure can be towed into a location such as a convention hall or an arena or the like and placed in a desired location with the wheels retracted and the frame on the floor or ground with a sufficient reserve of compressed air to raise the entire frame, extend the wheels and prepare the trailer for removal from such a location after it has been used for a desired period.

At each of the corners of the frame the tubes T1-T4 are mitered at 45 degree angles so as to provide corners which can be welded together. However, before the mitered corners 167 are welded, a transverse plate 166 is welded inside near the end of each tube around the entire periphery of the plate to seal the end of the tube for air retention purposes as described above. Thereafter the mitered portions are welded.

Another alternative for motive power in an outdoor or other permissible environment for lifting the trailer frame is to have an electrically startable small internal combustion engine driving a suitable air compressor or hydraulic pump to operate appropriate air or hydraulic jacks, as well as to operate air or hydraulic cylinders for actuating the wheel assemblies to and from their extended positions. When the trailer is to be used in certain environments it may be preferable to supply the internal combustion engine by propane bottled gas with both the engine and fuel supply concealed within the frame height and a suitable exhaust pipe extending to the outside of the frame.

Other variations within the scope of this invention will be apparent from the described embodiment and it is intended that the present descriptions be illustrative of the inventive features encompassed by the appended claims.

What is claimed is:

1. A roadway vehicle comprising a vehicle frame structure including frame portions defining first and second parallel planes corresponding to the top and bottom of the frame structure, and a retractable wheel assembly, said vehicle having a longitudinal direction of rolling movement along a flat roadway surface, said wheel assembly comprising:

a vehicle wheel, and means for supporting said wheel from said frame structure at one side of the vehicle for movement relative to said frame structure between an extended roadable position and a retracted position while said first plane remains parallel to said roadway surface, all parts of said wheel being on the same side of said first plane in both said roadable and said retracted positions, the means for supporting the wheel providing in said roadable position an axis having a fixed direction relative to said frame structure and about which the wheel rotates while supporting the vehicle while it rolls in its longitudinal direction along the roadway surface, said axis in said roadable position being perpendicular to said longitudinal direction and parallel to said first plane, the means for supporting the wheel providing in said retracted position an essentially fixed direction of said wheel axis relative to said frame structure, said axis in said retracted position being perpendicular to said longitudinal direction and perpendicular to said first plane, said wheel including a tire having in said roadable wheel position a tire sidewall facing along the direction of the wheel axis and a circumferential tread for rolling contact with said roadway, said tire in said retracted wheel position being located between said plates by the means for supporting the wheel so that the distance of said tire sidewall from said first plane is greater than the distance between said first plane and the nearest portion of said tread when the wheel is located in said roadable position by the wheel supporting means.

2. A roadway vehicle according to claim 1 wherein said tire sidewall faces outwardly relative to said vehicle frame structure at said one side of the vehicle when the wheel is in said roadable position and faces downwardly in the retracted wheel position.

3. A roadway vehicle according to claim 1 wherein the wheel's axis of rotation remains in essentially one plane extending perpendicular to the longitudinal direction of rolling movement of the vehicle throughout retracting or extending movement of the wheel between said roadable and said retracted positions.

4. A roadway vehicle according to claim 1 wherein said frame structure has lower surface portions for contacting a flat supporting roadway or other surface to support said frame structure when said wheel is retracted, and said first plane along with all portions of said wheel in its retracted position are within the height of a normal stair step above said flat supporting surface when said lower surface portions of the frame structure are resting on said flat supporting surface.

5. A roadway vehicle according to claim 4 wherein said step height is approximately eight inches.

6. A roadway vehicle according to claim 4 wherein jacking means are provided on said vehicle frame structure to raise and lower said frame structure relative to said roadway surface to permit movement of said wheel between said roadable and said retracted positions when said frame structure is jacked to a raised position and to enable said frame structure to be lowered into contact with said roadway surface when said wheel is in said retracted position.

7. A vehicle according to claim 6 wherein said jacking means includes a plurality of jack structures each operating by fluid pressure to raise the frame structure.

8. A trailer according to claim 7 wherein each said jack structure includes an inflatable bag to provide a lifting force.

9. A trailer according to claim 8 wherein said jacking means includes means to horizontally stabilize said frame structure while said inflatable bag is partially inflated during raising or lowering of the frame structure.

10. A trailer according to claim 9 wherein said means to horizontally stabilize said frame structure includes a horizontally rigid structure adjacent to each inflatable bag.

11. A trailer according to claim 9 wherein said means to horizontally stabilize said frame structure includes a horizontally rigid telescoping structure encircling each inflatable bag.

12. A trailer according to claim 1 including means to support said wheel supporting means for rotational movement between said roadable and retracted positions about a longitudinal axis extending parallel to said longitudinal direction, said longitudinal axis being located in said roadable position at the inboard side of the wheel and at a height near the top of said circumferential tire tread.

13. A roadway vehicle according to claim 4 wherein said vehicle is a trailer comprising such a retractable wheel assembly at each of two lateral sides of the trailer.

14. A trailer according to claim 13 including motor means for operating each wheel supporting means to move said wheels between their roadable and retracted positions.

15. A trailer according to claim 14 wherein jacking means are provided on said frame structure to raise and lower said frame structure relative to said roadway surface to permit movement of each said wheel between said roadable and said retracted positions when said frame structure is jacked to a raised position and to enable said frame structure to be lowered into contact with said roadway surface when all said wheels are in their retracted positions.

16. A trailer according to claim 15 including means for energizing said jacking means and said motor means for moving the wheels from a common energy source.

17. A trailer according to claim 16 wherein said common energy source is an electrical source carried by said frame structure.

18. A trailer according to claim 16 wherein said common energy source is a source of hydraulic pressure.

19. A trailer according to claim 16 wherein said common energy source is a reservoir for pressurized gas carried by said frame structure.

20. A trailer according to claim 16 wherein said common energy source is a source for supplying hydraulic pressure and each such jacking means and said motor means includes a double acting extensible and retractable hydraulic actuator.

21. A trailer according to claim 16 wherein a control system for the jacking means and the motor means is provided between said common energy source and said jacking means and said motor means, said control system including means respective to a fully raised position of said frame structure determined by said jacking means to prevent operation of said motor means until said frame structure is in its fully raised position.

22. A trailer according to claim 21 wherein said jacking means includes a plurality of separate jack structures and said control system includes means for coordinating the operation of each jack structure so that their lifting heights remain uniform throughout their lifting operation to keep said first plane of the frame structure level relative to the supporting surface.

23. A trailer according to claim 15 wherein each of said motor means and said jacking means includes a respective hydraulic actuating means for operation thereof.

24. A trailer according to claim 13 including fluid pressure actuating means for operating each wheel supporting means to move said wheels between their roadable and retracted positions.

25. A trailer according to claim 21 wherein said jacking means includes a plurality of separate jack structures and said control system includes means for coordinating the operation of each jack structures so that their lifting heights remain uniform throughout their lifting operation to keep said first plane of the frame structure level relative to the supporting surface.

26. A trailer according to claim 25 wherein a separate transversely extending plate is secured to each said elongated member, said frame structure including for each said plate a surface in face-to-face sliding engagement with a surface of the respective plate, means for releasably rigidly interconnecting said plates and said frame structure at said face-to-face surfaces only when the respective wheels are in their roadable positions.

27. A trailer according to claim 26 wherein each wheel is supported by means of a respective trailing arm structure pivotably supported on a respective one of said plates.

28. A trailer according to claim 27 wherein each said trailing arm structure is a narrow structure laterally inboard of the respective wheel when the wheel is in its roadable position and the combined lateral dimensions of the wheel and its trailing arm structure does not exceed about 7½ inches.

29. A trailerable vehicle according to claim 1 and having a frame structure comprising a plurality of interconnected structural tube members having upper and lower surfaces defining said parallel planes, said frame structure having means to seal said tube members over a major portion of their combined lengths to provide at least one reservoir means for storing pressurized gas for operating gas pressure accessories carried by the frame structure, said frame structure having pneumatic connecting means for connecting said reservoir means to external pneumatic lines, actuating means on said frame structure for jacking said frame structure relative to said supporting surface, actuating means on said frame structure for moving said wheel suspension means between said extended and retracted positions, and means for connecting at least one of said actuating means for operation by gas pressure in a respective reservoir means.

30. A trailerable vehicle according to claim 29 wherein said frame structure is about 7½ inches high.

31. A trailerable vehicle according to claim 29 wherein said frame structure is divided into a plurality of sealed reservoir means capable of storing pressurized gas at different pressures.

32. A trailerable vehicle according to claim 31 wherein said frame structure includes gas operated actuating means for jacking supplied by compressed gas from one reservoir means at one pressure and an accessory gas operated means supplied by compressed gas from a different reservoir means at a second different pressure.

33. A trailerable vehicle according to claim 32 wherein said accessory gas operated means comprises the actuating means for actuating said wheel supporting means between its roadable position and its retracted position.

34. A trailerable vehicle according to claim 29 wherein said frame is rectangular and is sealed so that all such reservoir means are spaced from the corners of the frame.

35. A roadway trailer having a front end and a longitudinal direction of rolling movement along a flat roadway surface,
the trailer comprising a trailer frame structure including frame portions defining first and second parallel planes corresponding to the top and bottom of the frame structure, and
a retractable wheel assembly at each of two lateral sides of the trailer,
each said wheel assembly comprising:
a trailer wheel, and means for supporting the respective said wheel from said frame structure at one side of the trailer for movement relative to said frame structure between an extended roadable position and a retracted position while said first plane remains parallel to said roadway surface, all parts of said wheel being on the same side of said first plane in both said roadable and said retracted positions,
each means for supporting a respective wheel providing in said roadable position an axis having a fixed direction relative to said frame structure and about which the wheel rotates while supporting the trailer while it rolls in its longitudinal direction along the roadway surface, said axis in said roadable position being perpendicular to said longitudinal direction and parallel to said first plane,
each means for supporting a respective wheel providing in said retracted position an essentially fixed direction of the wheel axis relative to said frame structure, which axis in said retracted position is perpendicular to said longitudinal direction and perpendicular to said first plane, each said wheel including a tire having in said roadable wheel position a tire sidewall facing along the direction of the wheel axis and a circumferential surface for rolling contact with said roadway,
said tire in said retracted wheel position being located between said planes,
said frame structure having lower surface portions in said second plane for contacting a flat supporting roadway or other surface to support said frame structure when said wheel is retracted, said first plane along with all portions of said wheel in its retracted position being within the height of a normal stair step above said flat supporting surface when said lower surface portions of the frame structure are resting on said flat supporting surface,
said trailer comprising an elongated towing means at the front end of the trailer, said towing means being movable lengthwise between an extended towing position in which said towing means extends substantially ahead of said frame structure for connection to a towing vehicle and a retracted non-towing position in which said towing means is located essentially totally within said frame structure, and locking means actuated by said towing means to lock each said wheel supporting means relative to said frame to retain the respective wheel in its roadable position when said towing means is in its extended position.

36. A trailer according to claim 35 wherein jacking means are provided on said frame structure to raise and lower said frame structure relative to said roadway surface to permit movement of each said wheel between said roadable and said retracted positions when said frame structure is jacked to a raised position and to enable said frame structure to be lowered into contact with said roadway surface when all said wheels are in their retracted positions.

37. A trailer according to claim 36 wherein said jacking means includes a separate jack structure on laterally opposite sides of the towing means at the front end of the trailer.

38. A trailer according to claim 37 wherein each said jack structure includes an inflatable bag to provide a lifting force.

39. A trailer according to claim 38 wherein said jacking means includes means to horizontally stabilize said frame structure while each said inflatable bag is partially inflated during raising or lowering of the frame structure.

40. A tailer according to claim 35, wherein each said means for supporting a respective wheel includes a plate facing a surface portion of said frame structure and said locking means includes means for releasably interconnecting said plates and said frame structure, including a locking member for each plate movable into locking engagement therewith to prevent movement of the plate relative to the frame structure, lever means engageable by said towing member for moving said locking members into said locking engagement only when all said wheels are in their roadable positions and said towing member is fully moved to its roadable or towing position.

41. A trailer according to claim 8 wherein hydraulic brake means is provided for at least one wheel at each side of the trailer, said towing member including an hydraulic surge actuator responsive to braking of a towing vehicle to generate hydraulic braking pressure in a brake line secured to the towing member, a wheel brake line secured to the supporting means for each wheel having hydraulic brake means, brake line means on said frame structure for interconnecting said towing member brake line to the wheel brake lines, said brake line means including a long flexible line having one end anchored on the frame structure and its other end secured to the brake line secured to the towing member, said brake line means including at each wheel brake line a flexible brake line portion to facilitate movement of the respective wheel between roadable and retracted positions.

42. A trailer according to claim 41 including retracting means to take up the excess length of said long flexible brake line when said towing member is moved to its retracted position within the frame structure.

43. A heavy road vehicle for running in a longitudinal direction on a road surface and including a frame structure, a wheel suspension assembly for said heavy road vehicle comprising:
   a vehicle wheel including a tire for running on said road surface,
   a trailing arm structure extending closely along only one side of the wheel,
   a cantilevered axle means extending transversely from said trailing arm structure for supporting said wheel in a roadable position for rotation about a transverse axis parallel to the road surface,
   said trailing arm structure including means at one end thereof beyond the periphery of said tire to pivotably mount it on a vehicle for swinging movement about an axis parallel to said wheel axis,
   no part of said wheel, said axle means or said trailing arm structure extending in the direction of said axle beyond the outer surface of the tire on the other side of the wheel, means for mounting said wheel suspension assembly on said frame structure for movement between an extended roadable position and a retracted position in which the wheel is positioned with its axis vertical and perpendicular to the road surface and within the height of the frame structure,
   said trailing arm structure being a narrow structure whereby the combined lateral dimensions of the wheel and said trailing arm structure does not exceed about 7½ inches in the direction of the wheel axis.

44. A road vehicle with a wheel suspension assembly according to claim 43 including leaf spring means narrower than said trailing arm structure and supported on top of said trailing arm structure near said axle means, said leaf spring means extending relative to said axle means generally in the opposite direction from said means for pivotably mounting the trailing arm structure.

45. A road vehicle with a wheel suspension assembly according to claim 43 which is roadable at highway speeds to carry a load of about 1000 pounds when it is pivotally attached to a vehicle with said leaf spring means in engagement with an abutment to resist upward movement of the spring means.

46. A road vehicle with a wheel suspension assembly according to claim 43 wherein said trailing arm structure has a second end extending relative to the axle means beyond the tire periphery generally in the opposite direction from said means for pivotably mounting the trailing arm.

47. A road vehicle with a wheel suspension assembly according to claim 46 and further including an air spring means supported by said frame structure beyond the tire periphery in engagement with said second end of the trailing arm structure.

48. A road vehicle according to claim 46 comprising two such suspension assemblies with the wheels in tandem relationship and the trailing arm structures extending in the same direction relative to their pivotably mounted ends, and further including at the other end of each trailing arm structure an air spring means supported by said vehicle beyond the periphery of the respective tire in engagement with said second end of the trailing arm structure, and means for pneumatically interconnecting said air spring means to balance loads applied to said trailing arm structure as said tires roll along irregular surface.

49. A portable platform having a flat top surface, side surfaces and a bottom surface for supporting the platform on a flat floor surface, said top, side and bottom surfaces being relatively fixed with respect to each other, the distance between said top and bottom surfaces not exceeding the height of a standard stair step,
   at least one wheel suspension means at each of two opposite sides of the platform,
   each wheel suspension means including a roadable wheel having a circumferential road engageable surface,
   means within said platform for supporting each said wheel suspension means in a roadable position relative to the platform with each wheel extending with the top of the road engageable surface being at a level between the top and bottom surfaces of said platform and the bottom of said road engageable surface being substantially below the bottom surface of the platform to enable towed highway movement of the platform with the wheel's circumferential road engaging surface rollable on a highway,
   an elongated towing member connected to and extending from a front end of the platform for connection to a towing vehicle, each said wheel suspension means and said towing member being movable to positions where they are completely enclosed within the platform within a height defined by said top and bottom surfaces when the bottom surface of the platform rests on said flat floor surface.

50. A portable platform according to claim 49 wherein the distance between said top and bottom surface is about 7½ inches.

51. A portable platform according to claim 49 wherein at least two such wheel suspension means are supported within the platform at each of said opposite sides of the platform.

52. A portable platform according to claim 49 wherein the means within said platform for supporting each said wheel suspension means includes pivoting support means to enable each wheel support means to be swung from the position in which the wheels engage a road surface to a retracted position within the platform.

* * * * *